US008274362B2

(12) United States Patent
Sato et al.

(10) Patent No.: US 8,274,362 B2
(45) Date of Patent: Sep. 25, 2012

(54) ELECTRONIC DEVICE AND METHOD FOR CONTROLLING THE SAME

(75) Inventors: Tatsuya Sato, Kanagawa (JP); Kikutada Yoshida, Tokyo (JP)

(73) Assignee: Sony Corporation (JP)

( * ) Notice: Subject to any disclaimer, the term of this patent is extended or adjusted under 35 U.S.C. 154(b) by 787 days.

(21) Appl. No.: 12/317,630

(22) Filed: Dec. 24, 2008

(65) Prior Publication Data
US 2009/0167552 A1      Jul. 2, 2009

(30) Foreign Application Priority Data
Dec. 27, 2007   (JP) ................ P2007-336779

(51) Int. Cl.
*G05B 19/02*      (2006.01)
(52) U.S. Cl. ........ 340/4.3; 340/1.1; 340/4.34; 340/4.35; 340/12.22
(58) Field of Classification Search ............ 340/4.3
See application file for complete search history.

(56) References Cited

U.S. PATENT DOCUMENTS
7,135,985 B2*   11/2006   Woolgar et al. ............... 340/4.3
2004/0160338 A1*   8/2004   Maxson et al. .......... 340/825.69

FOREIGN PATENT DOCUMENTS
JP            11-225381 A       8/1999

* cited by examiner

*Primary Examiner* — George Bugg
*Assistant Examiner* — Anthony D Afrifa-Kyei
(74) *Attorney, Agent, or Firm* — Lerner, David, Littenberg, Krumholz & Mentlik, LLP

(57) ABSTRACT

Disclosed herein is an electronic device that is connected to one or more other devices via a specified signal line and capable of operating in accordance with a control signal transmitted from any of the one or more other devices connected to the electronic device. The electronic device includes: a reception section configured to receive the control signal transmitted from any of the one or more other devices connected to the electronic device; a control section configured to perform a specified process if, after receiving a specific control signal, the reception section does not receive a control signal corresponding to the specific control signal within a set signal waiting period; and a waiting period adjustment section configured to adjust the signal waiting period based on traffic in the signal line.

7 Claims, 24 Drawing Sheets

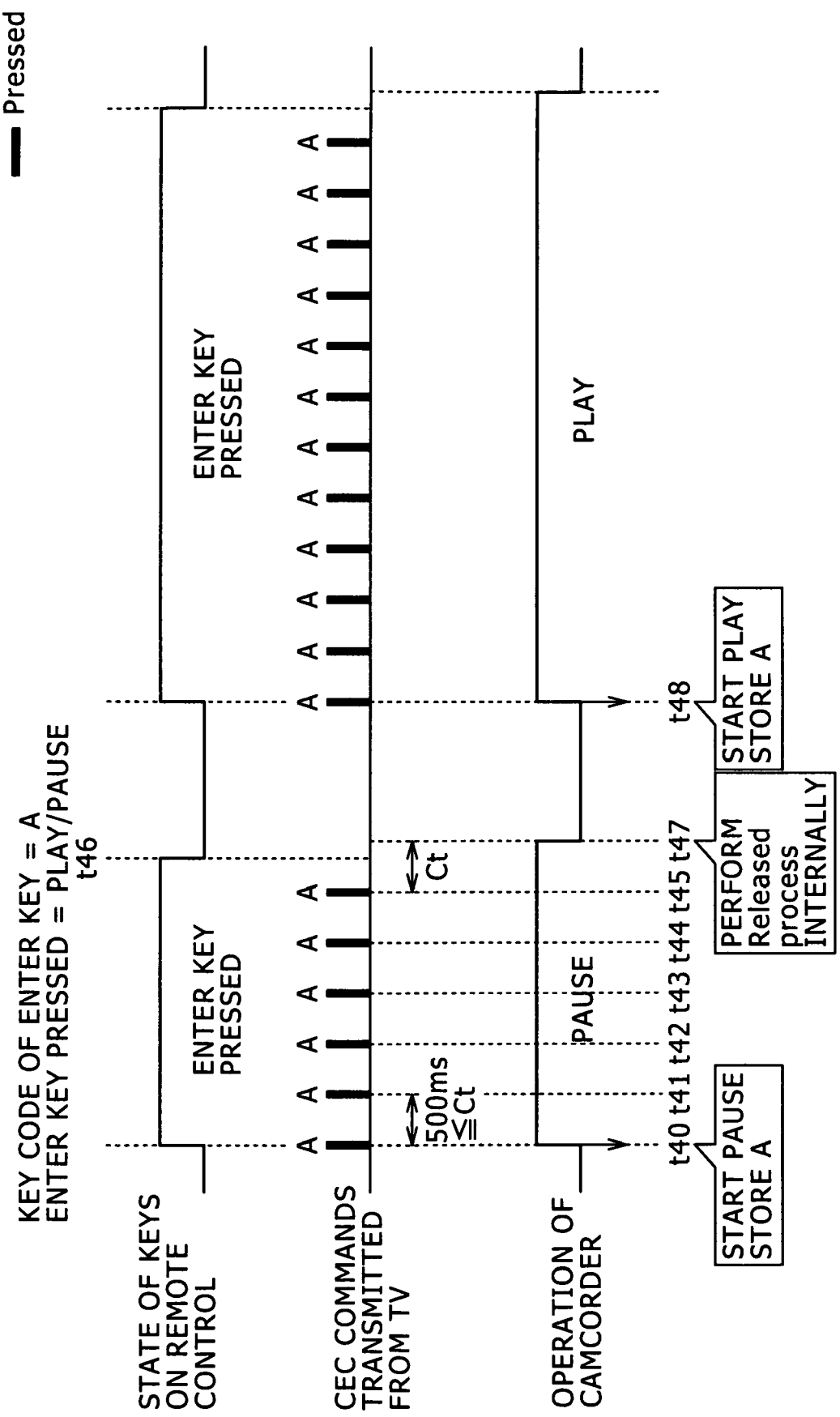

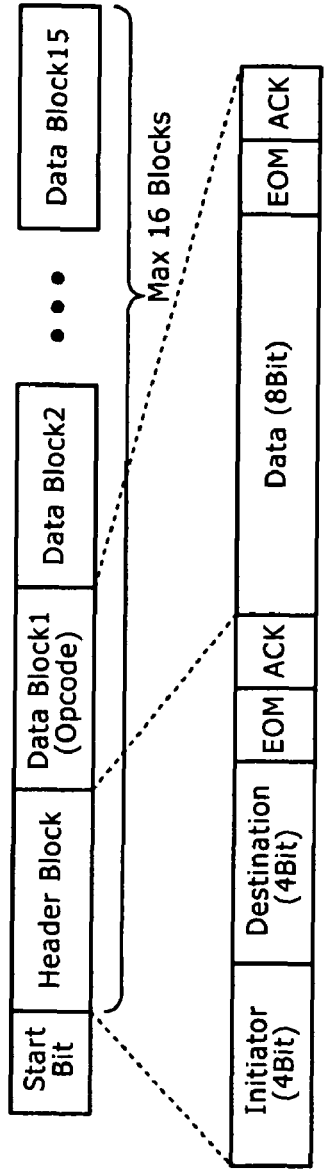
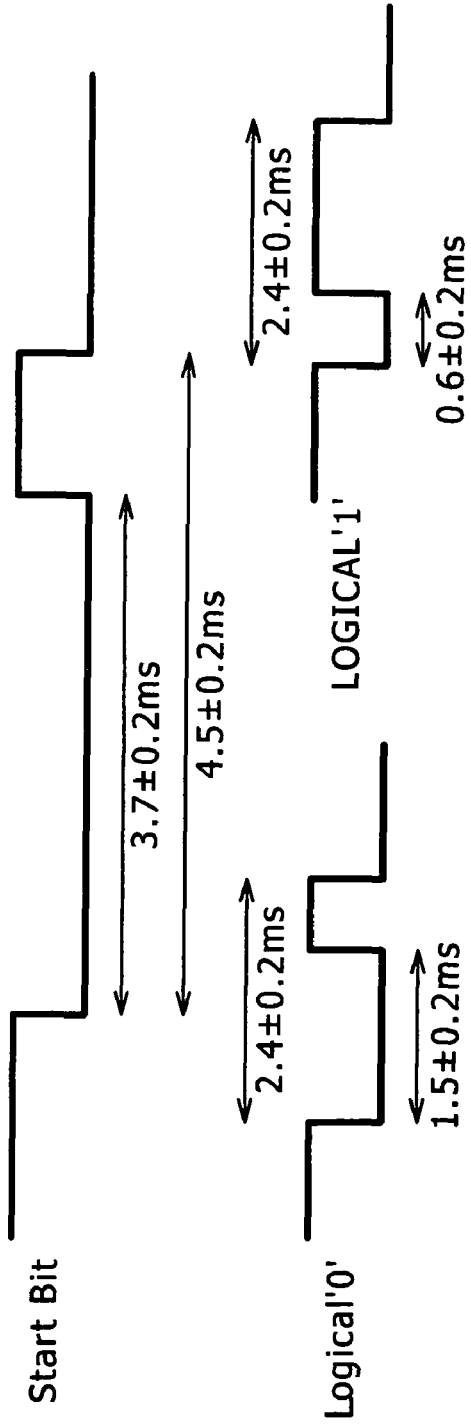
FIG.14A
FIG.14B

FIG.15

| ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

DEVICE CLASSIFICATION

TV : TELEVISION, PROJECTOR, ETC.
RECORDING DEVICE : HDD RECORDER, ETC.
TUNER : STB (SET-TOP BOX), ETC.
PLAYBACK DEVICE : DVD PLAYER, CAMCORDER, ETC.
AUDIO SYSTEM : AV AMPLIFIER, ETC.

FIG.17

| NUMBER OF CONNECTED DEVICES | ADJUSTMENT VALUE |
|---|---|
| 2 | 0ms |
| 3~5 | +300ms |
| 6~9 | +400ms |
| 10 OR GREATER | +500ms |

ELECTRONIC DEVICE AND METHOD FOR CONTROLLING THE SAME

CROSS REFERENCES TO RELATED APPLICATIONS

The present application claims priority from Japanese Patent Application No. JP 2007-336779, filed in the Japanese Patent Office on Dec. 27, 2007, the entire content of which is incorporated herein by reference.

BACKGROUND OF THE INVENTION

1. Field of the Invention

The present invention relates to an electronic device and a method for controlling the electronic device. For example, the present invention can be suitably applied to an electronic device that is capable of being connected to another device in accordance with the High-Definition Multimedia Interface (HDMI) standard.

2. Description of the Related Art

In recent years, the HDMI has become increasingly widespread as an interface for connecting electronic devices (e.g., audio-visual (AV) devices) that handle high-definition (HD) video to each other.

The HDMI is an interface that allows transmission and reception of the HD video between compatible devices by connecting the devices to each other via a cable compliant with the HDMI (this cable will be referred to also as an "HDMI cable" as appropriate). Use of the HDMI enables an HD video taken with a camcorder to be sent to a television receiver (hereinafter referred to simply as a "TV" as appropriate) via the HDMI cable so that the TV will display the HD video, for example.

The HDMI has a plurality of versions. The latest version of the HDMI has added thereto a feature of allowing the devices connected to each other via the HDMI cable to control each other. This feature is called Consumer Electronics Control (CEC). Hereinafter, to connect devices via the HDMI cable will be referred to as "to HDMI connect," as appropriate.

Referring to FIG. 1, the CEC is a feature of allowing the HDMI-connected devices to control each other via bidirectional serial communication therebetween using a CEC line (i.e., a line that connects the HDMI-connected devices using Pin 13). The CEC line is a signal line within the HDMI cable Hc.

In the CEC, control commands transmitted and received between the devices and a specification of a control protocol are defined. Use of the CEC allows the TV to turn off power of a camcorder that is HDMI connected to the TV, or allows the camcorder to cause the TV to display a screen of the camcorder, for example.

In addition, the CEC has a function, called "Remote Control Pass Through," of allowing a device that is HDMI connected to another device to notify the other device of an operation performed on a remote controller for the former device.

Use of the remote controller Pass Through makes it possible to operate the camcorder that is HDMI connected to the TV using a remote controller for the TV, for example.

There have been proposed a variety of remote controllers that can be used to operate a plurality of devices. Such remote controllers include remote controllers that allow a user to initiate sequential transmission of commands to a plurality of devices with a single key operation (see, for example, Japanese Patent Laid-open No. Hei 11-225381). Each manufacturer has proposed its own remote controllers. While the CEC in the HDMI has a unified specification, those remote controllers do not necessarily share a common specification. For example, some of those remote controllers are only capable of operating devices in a particular series of a particular manufacturer. In other words, each of those remote controllers is compatible with only limited types of devices.

The remote controller Pass Through of the CEC will now be described in detail below. A command (hereinafter referred to also as a "CEC command" as appropriate) called "User Control Pressed" is defined in the remote controller Pass Through. The User Control Pressed is a command for notifying another HDMI-connected device of pressing of a key on the remote controller.

For example, if the TV recognizes that any given key on the remote controller has been pressed, the TV transmits the User Control Pressed to the HDMI-connected camcorder together with a code of that key (this code will be referred to also as a "key code" as appropriate), thereby notifying the camcorder of the pressing of the key on the remote controller.

Moreover, a CEC command called "User Control Released" is defined in the remote controller Pass Through. The User Control Released is a command for notifying another HDMI-connected device of release of a key that had been held down.

For example, if the TV recognizes the release of any given key that had been held down, the TV transmits the User Control Released to the HDMI-connected camcorder, thereby notifying the camcorder of the release of the key that had been held down.

Some devices that may become a transmitter of the CEC commands (hereinafter referred to also as a "transmitter device" as appropriate) are configured to transmit the User Control Pressed's to a device that receives the CEC command (hereinafter referred to also as "a receiver device" as appropriate) successively at regular intervals (e.g., of 500 ms) while a key on the remote controller is held down, in order to indicate that the key is being held down.

If the receiver device receives the User Control Pressed's successively as a result of the holding down of the key, the receiver device normally performs the same operation as that which the receiver device would perform if the key had been pressed several times successively (this operation will be referred to also as a "repetitive operation" as appropriate).

However, depending on the instruction associated with the pressing of the key, the operation that is to be performed when the receiver device have received the User Control Pressed's successively is not an operation that is to be performed when the key has been pressed several times successively but an operation that is to be performed when the key has been pressed only once (this operation will be referred to also as a "one-shot operation" as appropriate).

Specifically, suppose that a playback control screen 1 of the camcorder is displayed on the TV as shown in FIG. 2, for example. On the playback control screen 1 are displayed: an HD video Mv played back by the camcorder; a variety of playback control buttons used to control playback of the HD video; and a cursor Cu used to select any of the playback control buttons. Examples of the playback control buttons include: a play/pause button 2, to which is assigned an instruction for starting the playback of the HD video when the HD video is not being played back and for pausing the playback of the HD video when the HD video is being played back; a previous button 3, to which is assigned an instruction for switching the HD video to be played back to an immediately previous HD video; and a next button 4, to which is assigned an instruction for switching the HD video to be played back to an immediately following (i.e., next) HD video.

In connection with this playback control screen 1, the user may use a directional key on the remote controller to select a desired one of the playback control buttons using the cursor Cu, which is movable over the screen, and thereafter press an enter key on the remote controller. In such a manner, the user is able to cause the camcorder to perform an operation (e.g., starting the playback of the HD video, pausing the playback of the HD video, switching to the immediately previous HD video, switching to the next HD video, or the like) in accordance with the instruction assigned to the selected playback control button.

Now, suppose that the enter key on the remote controller is pressed and held down in a situation where the play/pause button 2 is selected, for example. In this case, while the enter key is held down, a code of the enter key and the User Control Pressed are transmitted several times successively from the TV to the camcorder.

At this time, if the camcorder performs the repetitive operation, as when the enter key has been pressed several times successively, the camcorder will repeat a play operation and a pause operation alternately while the enter key is held down. This is not an operation intended by the user.

Therefore, in that case, i.e., in the case where the enter key on the remote controller is pressed and held down in the situation where the play/pause button 2 is selected, it is desirable that the camcorder perform a one-shot play operation or a one-shot pause operation, regardless of how long the enter key is held down until it is released.

Referring to a timing diagram of FIG. 3, suppose that the enter key on the remote controller is pressed in the situation where the play/pause button 2 is selected, so that the key code of the enter key and the User Control Pressed are transmitted from the TV to the camcorder, and that the camcorder receives the key code of the enter key and the User Control Pressed at time t1. In this case, at time t1, the camcorder recognizes that the enter key has been pressed in the situation where the play/pause button 2 is selected, and accordingly performs an operation (e.g., pausing the playback of the HD video) in accordance with the instruction (e.g., a Pause instruction) associated with the pressing of the enter key at this time, and stores the key code temporarily.

Thereafter, until receipt of the User Control Released, i.e., until recognition of release of the enter key, the camcorder continues to ignore receipt of the User Control Pressed accompanied by the same key code.

Then, the camcorder receives the User Control Released at time t2, and at this time, the camcorder recognizes that the enter key has been released, and accordingly discards the key code stored temporarily.

Thereafter, the enter key on the remote controller is pressed again, and the key code of the enter key and the User Control Pressed are transmitted to the camcorder. The camcorder receives the key code of the enter key and the User Control Pressed at time t3, and at this time, recognizes that the enter key has been pressed again, and accordingly performs an operation (i.e., starting the playback of the HD video) in accordance with the instruction (which is a Playback instruction this time) associated with the pressing of the enter key at this time, and stores the key code temporarily.

As described above, even if the enter key is pressed and held down in the situation where the play/pause button 2 is selected and, as a result, the User Control Pressed's are transmitted to the camcorder successively, the camcorder performs the one-shot operation in accordance with only the first User Control Pressed received after the pressing of the enter key, instead of performing the repetitive operation.

As described above, even if the key is pressed and held down, the camcorder, which can be the receiver device, performs not the repetitive operation but the one-shot operation in the case where the instruction associated with the pressing of the key is for an operation, such as the play/pause operation, that is to be preferably performed only once for one key pressing.

Notice here that, although CEC specifications recommend transmitting the User Control Released as a CEC command when the key pressed on the remote controller has been released, the CEC specifications do not specify that the User Control Released must be transmitted.

As such, for example, some TVs, which can be the transmitter device, are not configured to transmit the User Control Released when the key pressed on the remote controller has been released.

Referring to a timing diagram of FIG. 4, suppose that the camcorder, which is HDMI connected to any of such TVs, receives the key code of the enter key and the User Control Pressed from the TV at time t10, after the enter key on the remote controller is pressed in the situation where the play/pause button 2 is selected. In this case, at time t10, the camcorder recognizes that the enter key has been pressed in the situation where the play/pause button 2 is selected, and accordingly performs an operation (e.g., pausing the playback of the HD video) in accordance with the instruction (e.g., the Pause instruction) associated with the pressing of the enter key at this time, and stores the key code temporarily.

Thereafter, the camcorder continues to ignore the receipt of the User Control Pressed accompanied by the same key code until the receipt of the User Control Released accompanied by the same key code as that temporarily stored, i.e., until the camcorder recognizes that the enter key pressed has been released.

However, this TV does not transmit the User Control Released even if the enter key is released at time t11, for example.

Therefore, even if the enter key is released at time t11, the camcorder is unable to recognize the release of the enter key, and even if the camcorder receives the User Control Pressed accompanied by the same key code at time t12, for example, after the enter key on the remote controller is pressed again, the camcorder ignores the User Control Pressed at this time, erroneously determining that the enter key has been held down continuously since time t10.

Accordingly, the camcorder neglects to perform an operation (i.e., starting the playback of the HD video) that should be performed at time t12.

As described above, in the case where the User Control Released is not transmitted even when the enter key pressed has been released, the camcorder fails to recognize the release of the enter key, and after performing the operation in accordance with the first User Control Pressed received after the pressing of the enter key, the camcorder will not accept any operation on the enter key, even if the enter key is released or pressed again. As a result, the camcorder will not be able to operate properly in accordance with the operation on the remote controller.

As such, the CEC specifications recommend that, if the receiver device does not receive, within a predetermined period of time after receipt of the User Control Pressed, either the User Control Released or the User Control Pressed accompanied by the same key code, the receiver device should internally perform a process (which will be referred to also as a "Released process" as appropriate) that is to be performed if the receiver device receives the User Control Released. The predetermined period of time mentioned above will be hereinafter referred to as a "command waiting period" as appropriate, and is set, for example, to 500 ms, which corresponds to the length of the intervals at which the transmitter device transmits the CEC commands when transmitting them successively.

Specifically, referring to a timing diagram of FIG. 5, suppose that the enter key on the remote controller is pressed in the situation where the play/pause button 2 is selected, so that the key code of the enter key and the User Control Pressed are transmitted from the TV to the camcorder, and that the camcorder receives the key code of the enter key and the User Control Pressed at time t20. In this case, at time t20, the camcorder recognizes that the enter key has been pressed in the situation where the play/pause button 2 is selected, and accordingly performs an operation (e.g., pausing the playback of the HD video) in accordance with the instruction (e.g., the Pause instruction) associated with the pressing of the enter key at this time, and stores the key code temporarily.

Thereafter, the camcorder receives the User Control Pressed accompanied by the same key code again, at time t21, which is within a command waiting period Ct from time t20, at which the camcorder received the first User Control Pressed. At time t21, the camcorder recognizes that the enter key is still held down, and accordingly ignores the User Control Pressed.

Thereafter, the camcorder receives the User Control Pressed accompanied by the same key code several times (at times t22, t23, t24, and t25) within the command waiting period Ct from the previous receipt of the User Control Pressed (at times t21, t22, t23, and t24, respectively), but the camcorder similarly ignores the User Control Pressed each of these times.

Then, the enter key is released at time t26, previous to a time at which the User Control Pressed is to be transmitted next (i.e., 500 ms after the last transmission of the User Control Pressed). At time t26, the TV stops the transmission of the User Control Pressed. It is assumed here that the TV is a transmitter device that does not transmit the User Control Released even if the enter key is released.

Then, because the camcorder does not receive the User Control Pressed accompanied by the same key code within the command waiting period Ct from time t25, at which the camcorder received the latest User Control Pressed, the camcorder recognizes that the enter key has been released, at time t27, i.e., the command waiting period Ct after time t25.

Then, at time t27, the camcorder internally performs the Released process. That is, the camcorder discards the key code temporarily stored.

Thereafter, the enter key on the remote controller is pressed again, so that the key code of the enter key and the User Control Pressed are transmitted to the camcorder, and the camcorder receives the key code of the enter key and the User Control Pressed at time t28. At time t28, the camcorder recognizes that the enter key has been pressed again, and accordingly performs an operation (i.e., starting the playback of the HD video) in accordance with the instruction (which is the Playback instruction this time) associated with the pressing of the enter key at this time, and stores the key code temporarily.

As described above, the camcorder, which can be the receiver device, internally performs the Released process if the camcorder does not receive the User Control Pressed accompanied by the same key code again within the command waiting period Ct from the previous receipt of the User Control Pressed. Thus, even when HDMI connected to the transmitter device that does not transmit the User Control Released, the camcorder is capable of operating properly in accordance with the operation on the remote controller.

As described above, if the existing receiver device receives the User Control Pressed, which is the CEC command indicating that a key has been pressed, and then receives the User Control Pressed accompanied by the same key code again within the command waiting period Ct from the previous receipt of the User Control Pressed, the receiver device determines that the key indicated by this key code is still held down.

Here, in the case where the instruction associated with the pressing of this key is a prescribed instruction, the receiver device ignores all User Control Pressed's except the first User Control Pressed received after the pressing of the key.

Thus, even if the key is pressed and held down, so that the receiver device receives the User Control Pressed's successively, the receiver device does not perform the repetitive operation but performs the one-shot operation. Further, in the case where, after receiving the User Control Pressed, the receiver device does not receive either the User Control Released or the User Control Pressed accompanied by the same key code within the command waiting period from the receipt of the User Control Pressed, the receiver device recognizes that the key indicated by this key code has been released, and internally performs the Released process.

Thus, even when HDMI connected to the transmitter device that does not transmit the User Control Released, the receiver device is capable of operating properly in accordance with the operation on the remote controller.

SUMMARY OF THE INVENTION

Here, the HDMI is used in situations where a plurality of devices are connected to each other. Referring to FIG. 6, assume here that a camcorder 11 and a digital still camera 12 are connected to a TV 10 having a plurality of HDMI ports via an HDMI cable Hc1 and an HDMI cable Hc2, respectively, that an AV (Audio video) amplifier 13 having a plurality of HDMI ports is connected to the TV 10 via an HDMI cable Hc3, and that a BD (Blu-ray Disc) recorder 14 is connected to the AV amplifier 13 via an HDMI cable Hc4, for example.

Here, within each of the TV 10 and the AV amplifier 13, both of which have the plurality of HDMI ports, a CEC line CL, which is a signal line within the HDMI cable Hc, connects the plurality of HDMI ports to each other. As a result, all the HDMI-connected devices are connected to one another via the single CEC line CL, which allows any pair of HDMI-connected devices to transmit and receive the CEC command therebetween.

In this case, because all the HDMI-connected devices share the single CEC line CL, issuance of multiple CEC commands at a time may increase traffic (i.e., the amount of congestion) in the CEC line CL so greatly that a delay may occur in the transmission and reception of the CEC command.

When the delay occurs in the transmission and reception of the CEC command, the transmitter device is unable to transmit the User Control Pressed at a time when it should be transmitted, for example, which might result in an inability of the receiver device to accurately recognize the operation performed on the remote controller.

Referring to a timing diagram of FIG. 7, suppose, for example, that the enter key on the remote controller is pressed in the situation where the play/pause button 2 is selected, so that the key code of the enter key and the User Control Pressed are transmitted from the TV 10 to the camcorder 11, and that the camcorder 11 receives the key code of the enter key and the User Control Pressed at time t30. At time t30, the camcorder 11 recognizes that the enter key has been pressed in the situation where the play/pause button 2 is selected, and accordingly performs an operation (e.g., starting the playback of the HD video) in accordance with the instruction (e.g., the Playback instruction) associated with the pressing of the enter key at this time, and stores the key code temporarily.

Thereafter, the camcorder 11 receives the User Control Pressed accompanied by the same key code again at time t31, which is within the command waiting period Ct from time t30, at which the camcorder 11 received the first User Control Pressed. At time t31, the camcorder 11 recognizes that the enter key is still held down, and accordingly ignores the User Control Pressed.

Thereafter, the camcorder 11 receives the User Control Pressed accompanied by the same key code several times (at times t32, t33, t34, and t35) within the command waiting period Ct from the previous receipt of the User Control Pressed (at times t31, t32, t33, and t34, respectively), but the camcorder 11 similarly ignores the User Control Pressed each of these times.

It is assumed here that due to an increase in the traffic in the CEC line CL, the TV 10 transmits next User Control Pressed later than a time at which it is expected to be transmitted (i.e., 500 ms after the last transmission of the User Control Pressed).

Then, due to the fact that the camcorder 11 does not receive the User Control Pressed accompanied by the same key code within the command waiting period Ct (i.e., 500 ms) from time t35, at which the camcorder 11 received the latest User Control Pressed, the camcorder 11 erroneously performs the internal Released process (i.e., the discarding of the key code) at time t36, i.e., the command waiting period Ct after time t35, determining that the enter key has been released, despite the fact that the enter key is still held down.

Thereafter, at time t37, the camcorder 11 receives the User Control Pressed transmitted by the TV 10 at a delayed time. At time t37, the camcorder 11 erroneously determines that the enter key has been pressed again, and performs an operation (i.e., pausing the playback of the HD video) in accordance with the instruction (which is the Pause instruction this time) associated with the pressing of the enter key at this time, and stores the key code temporarily.

As described above, if a delay occurs in the transmission of the User Control Pressed from the transmitter device due to the increase in the traffic, the receiver device may fail to accurately recognize that the key is still held down, resulting in an inability to operate properly in accordance with the operation on the remote controller.

In other words, in the case of the existing receiver device, if the traffic in the CEC line CL increases, the receiver device may operate in an abnormal manner (i.e., differently from when there is not the influence of the traffic) due to the influence of the increase in the traffic.

The present invention addresses the above-identified, and other problems associated with hitherto known methods and apparatuses, and provides an electronic device that is capable of operating regularly, regardless of traffic in a signal line that connects the electronic device and another device to each other, based on a control signal transmitted from the other device, and a method for controlling such an electronic device.

According to one embodiment of the present invention, there is provided an electronic device that is connected to one or more other devices via a specified signal line and capable of operating in accordance with a control signal transmitted from any of the one or more other devices connected to the electronic device. The electronic device includes: a reception section configured to receive the control signal transmitted from any of the one or more other devices connected to the electronic device; a control section configured to perform a specified process if, after receiving a specific control signal, the reception section does not receive a control signal corresponding to the specific control signal within a set signal waiting period; and a waiting period adjustment section configured to adjust the signal waiting period based on traffic in the signal line.

The signal waiting period is adjusted based on the traffic in the signal line. Therefore, when a delay is likely to occur in transmission of the control signal due to increased traffic in the signal line, for example, the electronic device is able to wait for the specific control signal within the thus extended signal waiting period, and determine whether or not to perform the specified process based on whether or not the specific control signal has been received within the extended signal waiting period. In other words, the electronic device is able to determine whether or not to perform the specified process, without considering the influence of the traffic in the signal line.

According to another embodiment of the present invention, there is provided a method for controlling an electronic device that is connected to one or more other devices via a specified signal line and capable of operating in accordance with a control signal transmitted from any of the one or more other devices connected to the electronic device. The method includes the steps of: receiving, by a reception section, the control signal transmitted from any of the one or more other devices connected to the electronic device; adjusting, by a waiting period adjustment section, a signal waiting period, for which the control signal is waited for, based on traffic in the signal line; and performing, by a control section, a specified process if, after receiving a specific control signal in the receiving, a control signal corresponding to the specific control signal is not received within the signal waiting period as adjusted in the adjusting.

As described above, according to the embodiments of the present invention, there are provided an electronic device that is capable of operating regularly, regardless of the traffic in the signal line that connects the electronic device and another device to each other, based on the control signal transmitted from the other device, and a method for controlling such an electronic device.

BRIEF DESCRIPTION OF THE DRAWINGS

FIG. 13 is a timing diagram illustrating one example of an operation of the camcorder at the time of receiving the CEC commands according to the first embodiment;

FIGS. 14A and 14B illustrate the structure of a CEC message;

FIG. 15 shows logical addresses to be assigned to HDMI-connected devices;

FIG. 17 shows adjustment values for a command waiting period set for each possible number of connected devices;

DETAILED DESCRIPTION OF THE PREFERRED EMBODIMENTS

Hereinafter, preferred embodiments of the present invention will be described with reference to the accompanying drawings.

(1) First Embodiment

(1-1) Structure of Inter-Device Control System

Figure 8:
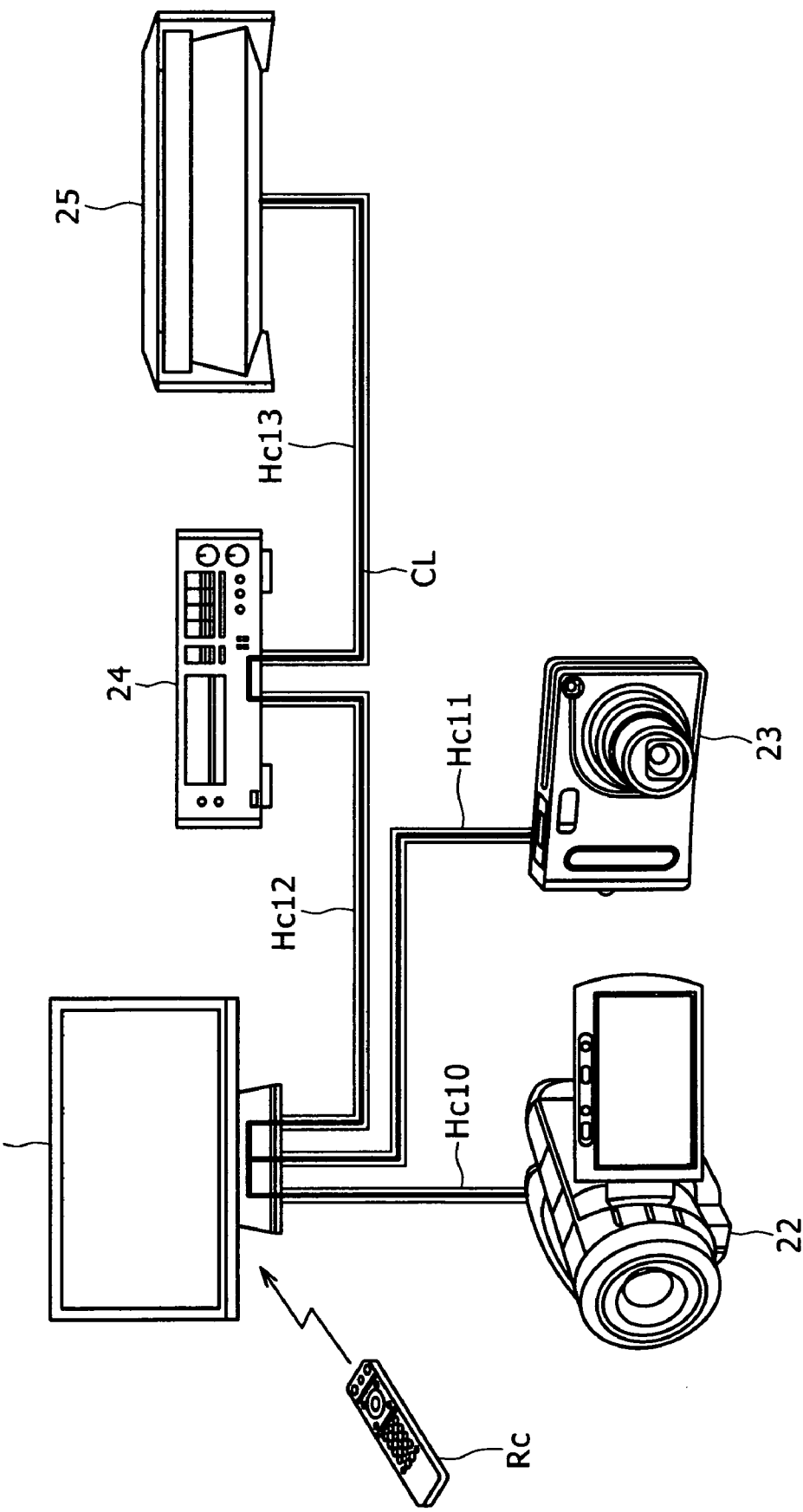
FIG. 8 illustrates the structure of an inter-device control system according to a first embodiment of the present invention.

FIG. 8 shows an inter-device control system 20 composed of a plurality of devices that are HDMI connected to one another. In the inter-device control system 20 as shown in FIG. 8, a camcorder 22 and a digital still camera 23 are connected to a TV 21, which has a plurality of HDMI ports, via an HDMI cable Hc10 and an HDMI cable Hc11, respectively, and an AV amplifier 24, which also has a plurality of HDMI ports, is connected to the TV 21 via an HDMI cable Hc12. In addition, a BD recorder 25 is connected to the AV amplifier 24 via an HDMI cable Hc13.

Here, within each of the TV 21 and the AV amplifier 24, both of which have the plurality of HDMI ports, a CEC line CL, which is a signal line within the HDMI cable Hc, connects the plurality of HDMI ports to each other. As a result, all the HDMI-connected devices are connected to one another via the single CEC line CL, which allows any pair of HDMI-connected devices to transmit and receive a CEC command therebetween.

In the inter-device control system 20, Remote Control Pass Through of CEC is used to make it possible to operate (i.e., control) each device therein by using a remote controller Rc for the TV 21.

Figure 9:
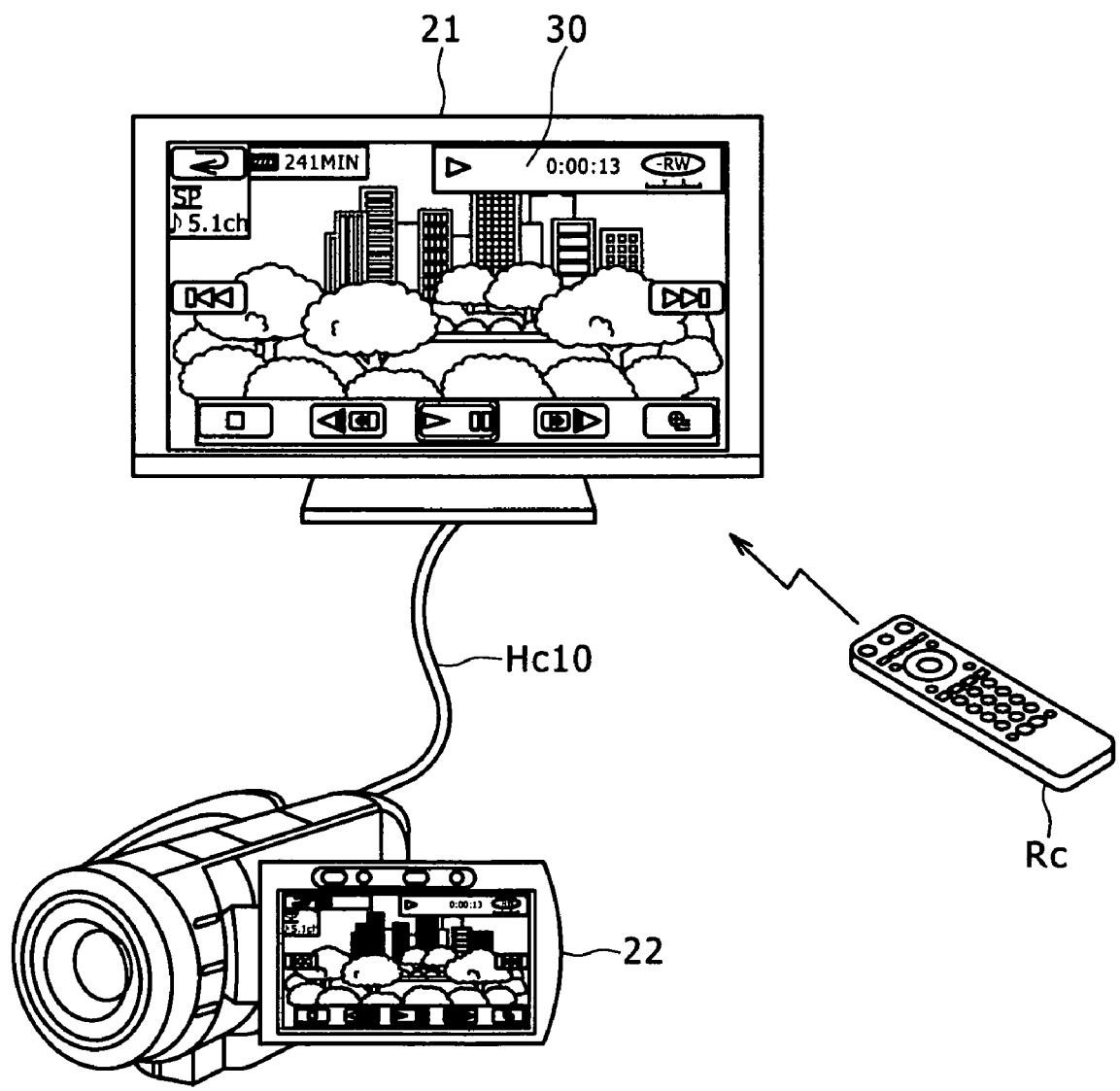
FIG. 9 shows a TV displaying a screen of a camcorder.

Specifically, referring to FIG. 9, for example, the camcorder 22 transmits screen data to the TV 21 via the HDMI cable Hc10 to cause the TV 21 to display a playback control screen 30, which is a screen of the camcorder 22.

Figure 10:
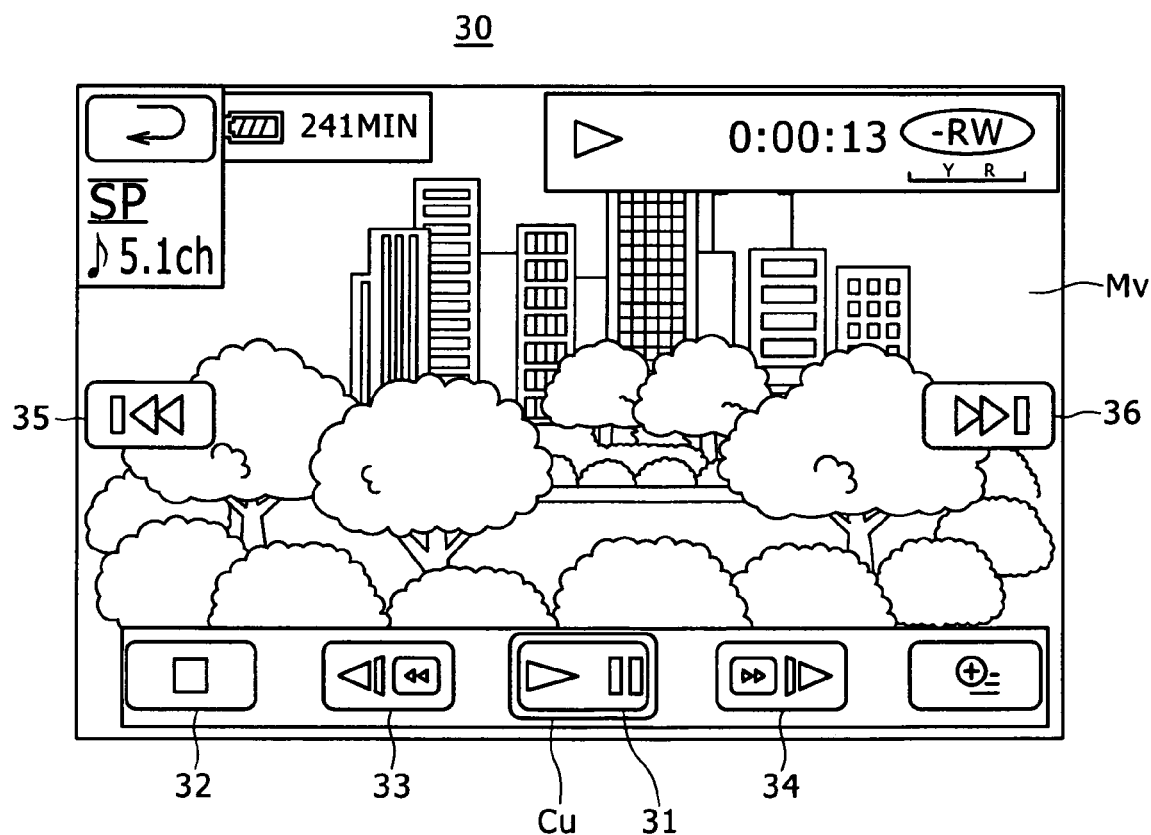
FIG. 10 shows another example of a playback control screen.

Referring to FIG. 10, on the playback control screen 30 are displayed: an HD video Mv played back by the camcorder 22; a variety of playback control buttons used to control playback of the HD video; and a cursor Cu used to select any of the playback control buttons. Examples of the playback control buttons include: a play/pause button 31, to which is assigned an instruction for starting the playback of the HD video when the HD video is not being played back and for pausing the playback of the HD video when the HD video is being played back; a stop button 32, to which is assigned an instruction for stopping the playback of the HD video; a Rewind button 33, to which is assigned an instruction for rewinding the HD video; a Fast-forward button 34, to which is assigned an instruction for fast-forwarding the HD video; a previous button 35, to which is assigned an instruction for switching the HD video to be played back to an immediately previous HD video; and a next button 36, to which is assigned an instruction for switching the HD video to be played back to an immediately following (i.e., next) HD video.

If an operation is performed on the displayed playback control screen 30 using the remote controller Rc, the TV 21 transmits, to the camcorder 22, a CEC command representing that operation (i.e., an operation performed on the remote controller Rc as aimed at the playback control screen 30).

Based on the CEC command transmitted from the TV 21, the camcorder 22 recognizes the operation performed on the remote controller Rc as aimed at the playback control screen 30, and performs an operation (e.g., starting the playback of the HD video, pausing the playback of the HD video, stopping the playback of the HD video, rewinding the HD video, fast-forwarding the HD video, switching to the immediately previous HD video, switching to the next HD video, or the like) in accordance with the operation performed on the remote controller Rc.

As described above, in the inter-device control system 20, a user is able to operate the camcorder 22 using the remote controller Rc with the same feeling with which the user operates the TV 21 using the remote controller Rc. The user is also able to operate the digital still camera 23, the AV amplifier 24, or the BD recorder 25 in a similar manner, using the remote controller Rc.

In the above example, the TV 21 is caused to display the playback control screen 30, which is a screen of the camcorder 22, and the user operates the remote controller Rc to perform an operation on the playback control screen 30 to cause the camcorder 22 to control the playback of the HD video. However, the TV 21 may be caused to display another screen to allow the camcorder 22 to display a thumbnail of the HD video or delete a file of the HD video, for example.

(1-2) Structure of Remote Controller

Figure 11:
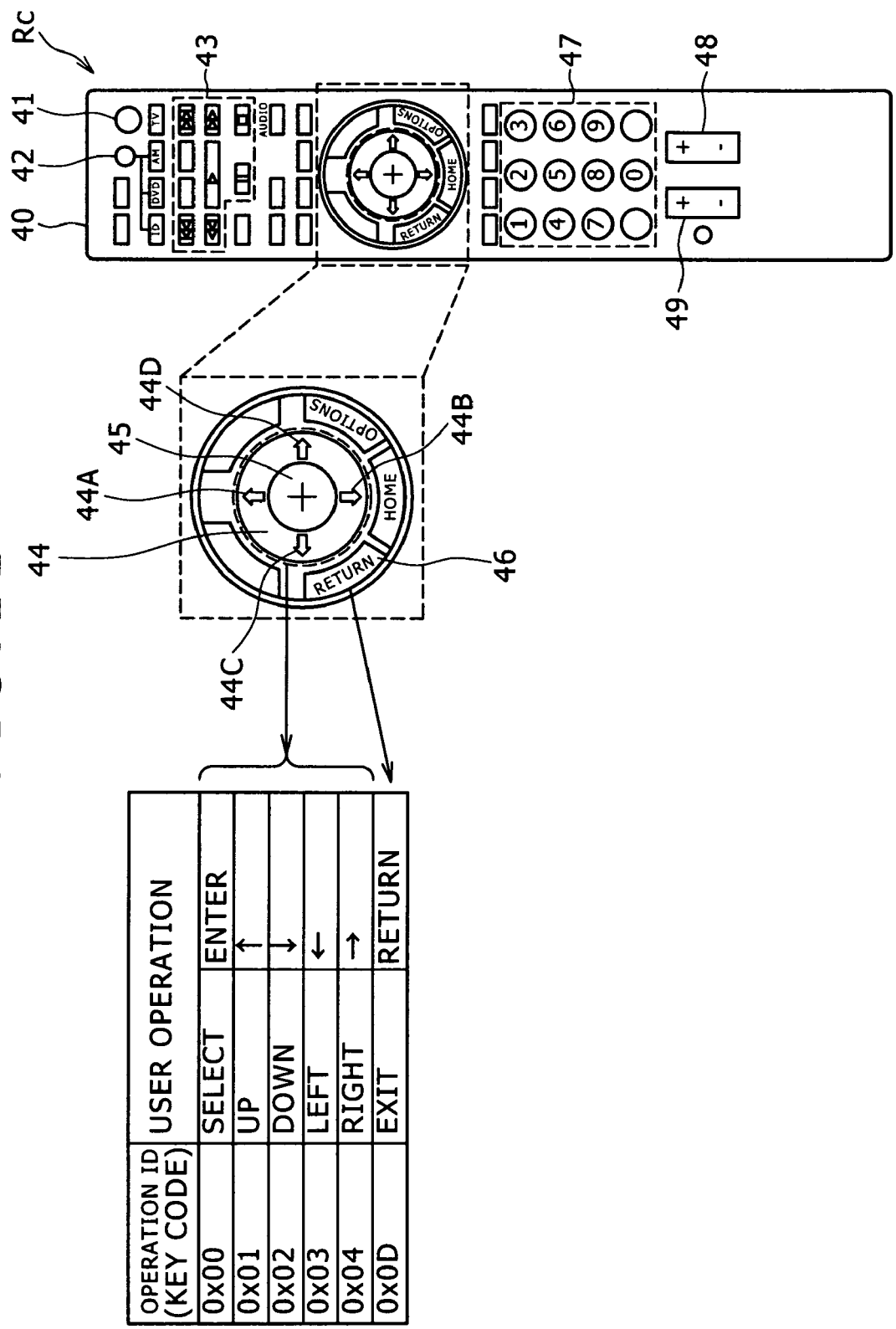
FIG. 11 shows a remote controller and key codes assigned to keys thereon.

The structure of the remote controller Rc for the TV 21 will now be briefly described below. As shown in FIG. 11, the remote controller Rc has a rectangular housing 40. A power key 41 used to turn on and off power of the TV 21 and a power key 42 used to turn on and off power of a device that is HDMI connected to the TV 21 are provided at an upper end part of one face of the housing 40.

Below the power keys 41 and 42 are provided a variety of playback control keys 43 used for playback control, such as control of the playback of an HD video in a device that is HDMI connected to the TV 21. Below the variety of playback control keys 43 are provided a directional key 44, an enter key 45, a return key 46, and so on. The directional key 44 is composed of an up key 44A, a down key 44B, a left key 44C, and a right key 44D used for cursor operation on a screen displayed on the TV 21, for example. The enter key 45 is used to determine the operation on the screen, for example. The return key 46 is used for a Return operation on the screen, for example.

Below the keys 44, 45, and 46 are provided number keys 47, a channel key 48, a volume key 49, and so on. The number keys 47 are used to select a channel of television broadcasting, for example. The channel key 48 is used to switch the channel. The volume key 49 is used for volume control.

If any of the keys on the remote controller Rc is pressed, the remote controller Rc transmits an infrared signal including a key code uniquely assigned to the pressed key, thereby allowing the TV 21 to recognize the operation performed on the remote controller Rc. Each of the keys on the remote controller Rc is assigned a separate specific key code (e.g., "0x00" for the enter key 45, "0x01" for the up key 44A, and so on).

(1-3) Circuit Structure of Camcorder

Next, the circuit structure of the device in the inter-device control system 20 will now be described below. The first embodiment of the present invention centers around receipt of the CEC commands using the remote controller Pass Through. Therefore, the circuit structure of the camcorder 22, which is a device (i.e., a receiver device) that receives the CEC commands, will be described by way of example.

Figure 12:
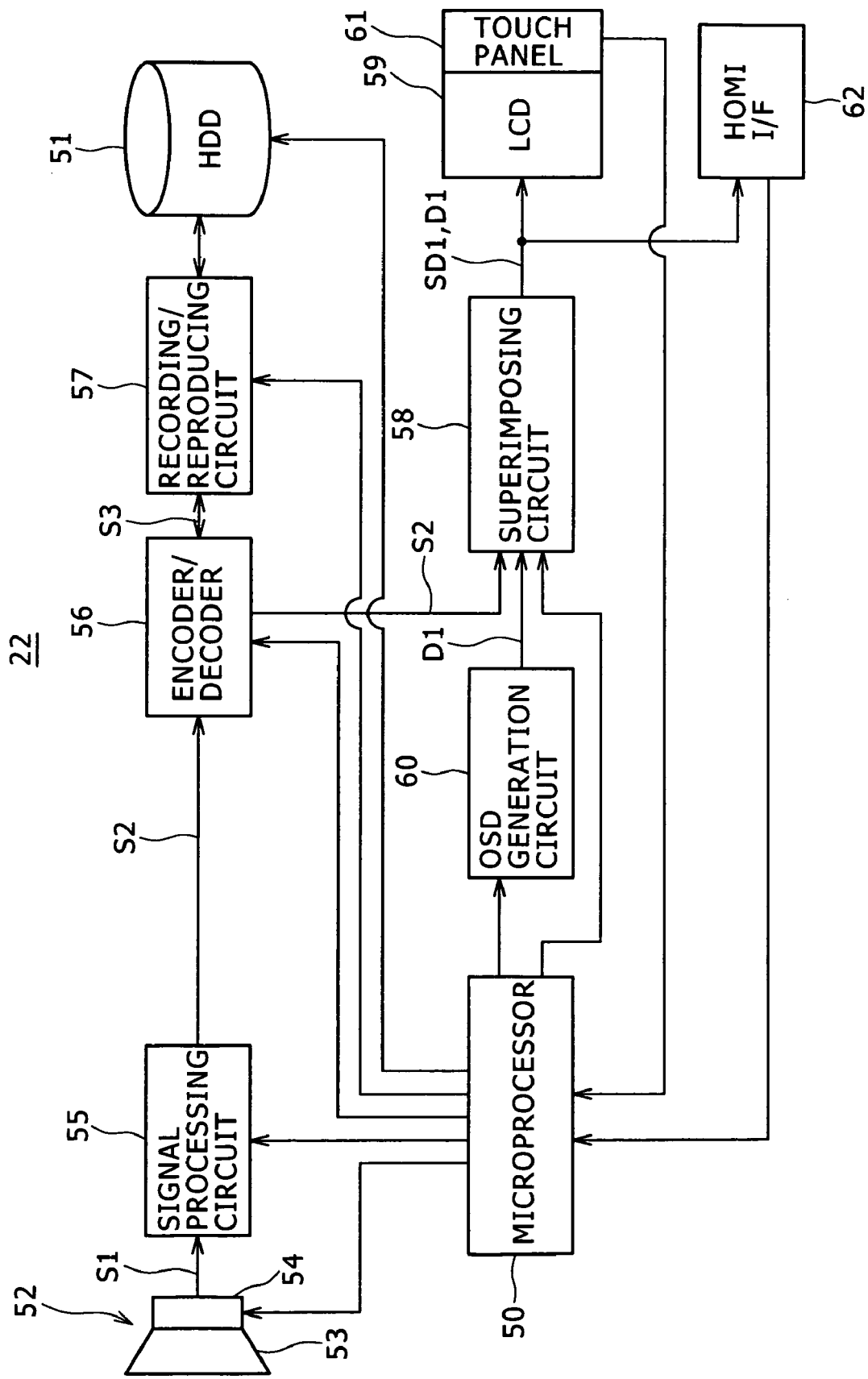
FIG. 12 is a block diagram illustrating the circuit structure of the camcorder.

As shown in FIG. 12, the camcorder 22 has a microprocessor 50, i.e., a central processing unit (CPU). The microprocessor 50 reads a base program and a variety of application programs from an internal memory (not shown) or a hard disk drive 51, and executes centralized control over the entire circuitry and performs a variety of processes (including an imaging process, a playback process, and a CEC command reception process) in accordance with the base program and the application programs.

At the time of imaging, the camcorder 22 uses a lens 53 in an imaging section 52 to allow an image of a subject to be formed on an imaging element 54, which is formed by a charge-coupled device (CCD), to obtain an HD video signal S1, and sends the HD video signal S1 to a signal processing circuit 55.

The signal processing circuit 55 subjects the HD video signal S1 to processes such as gamma correction and auto gain control (AGC), and converts the HD video signal S1 into digital HD video data S2. Thereafter, the signal processing circuit 55 sends the digital HD video data S2 to an encoder/decoder 56.

The encoder/decoder 56 performs an encoding process on the HD video data S2 in accordance with a specified encoding system to obtain compressed HD video data S3, and records the compressed HD video data S3 onto the hard disk drive 51 via a recording/reproducing circuit 57.

Meanwhile, at the time of playback, the camcorder 22 uses the recording/reproducing circuit 57 to read the compressed HD video data S3 from the hard disk drive 51, then uses the encoder/decoder 56 to decode the compressed HD video data S3 to obtain the original HD video data S2, and then causes the HD video data S2 to be outputted to a liquid crystal display (LCD) 59 via a superimposing circuit 58. As a result, an HD video based on this HD video data S2 is displayed on the LCD 59.

In addition, the camcorder 22 uses an on-screen display (OSD) generation circuit 60 to generate OSD data D1 representing graphics of menu items, a variety of buttons, etc., used to operate the camcorder 22, and sends the OSD data D1 to the superimposing circuit 58.

Then, if the superimposing circuit 58 has been supplied by the encoder/decoder 56 with the HD video data S2, the superimposing circuit 58 superimposes the OSD data D1 supplied from the OSD generation circuit 60 upon the HD video data S2 to obtain OSD-superimposed video data SD1, and sends the OSD-superimposed video data SD1 to the LCD 59. Meanwhile, if the superimposing circuit 58 has not been supplied by the encoder/decoder 56 with the HD video data S2, the superimposing circuit 58 sends only the OSD data D1 supplied from the OSD generation circuit 60 to the LCD 59. As a result, a screen based on the OSD-superimposed video data SD1 or the OSD data D1 is displayed on the LCD 59. The playback control screen 30 as mentioned above is an example of screens that are displayed on the LCD 59 in the above-described manner.

If the microprocessor 50 in the camcorder 22 recognizes that an operation has been performed on the screen (e.g., the playback control screen 30) displayed on the LCD 59 through a touch panel 61 provided on a front surface of the LCD 59, the microprocessor 50 performs a controlling operation (e.g., starting the playback of the HD video, pausing the playback of the HD video, stopping the playback of the HD video, rewinding the HD video, fast-forwarding the HD video, switching to the immediately previous HD video, switching to the next HD video, or the like) in accordance with that operation.

Further, the microprocessor 50 in the camcorder 22 sends the OSD-superimposed video data SD1 obtained by the superimposing circuit 58 or the OSD data D1 to the TV 21 via an HDMI interface 62 and the HDMI cable Hc10, as necessary. As a result, the screen based on the OSD-superimposed video data SD1 or the OSD data D1, e.g., the playback control screen 30, is displayed on the TV 21.

If an operation is performed on the screen (e.g., the playback control screen 30) displayed on the TV 21 using the remote controller Rc for the TV 21, and a CEC command representing this operation is transmitted from the TV 21 to the camcorder 22 over the CEC line CL in the HDMI cable Hc10, the microprocessor 50 acquires this CEC command via the HDMI interface 62.

Then, based on the acquired CEC command, the microprocessor 50 recognizes the operation performed on the remote controller Rc as aimed at the screen (e.g., the playback control screen 30) displayed on the TV 21, and performs a controlling operation (e.g., starting the playback of the HD video, pausing the playback of the HD video, stopping the playback of the HD video, rewinding the HD video, fast-forwarding the HD video, switching to the immediately previous HD video, switching to the next HD video, or the like) in accordance with that operation.

Thus, the camcorder 22 can be operated by using the remote controller Rc for the TV 21.

In addition, the camcorder 22 is capable of measuring various types of times using a timer contained in the microprocessor 50. This will be described in detail later.

(1-4) Operation of Camcorder 22 in Accordance with CEC Commands

Here, the operation of the camcorder 22 when the camcorder 22 has received the CEC command transmitted from the TV 21 in accordance with the operation on the remote controller Rc will now be described in detail below.

The operation of the camcorder 22 when the camcorder 22 has received the CEC command is basically the same as an operation of a receiver device that complies with known CEC specifications. Note that the TV 21, which transmits the CEC command, is assumed to be a device that, when any key on the remote controller Rc is pressed and held down, transmits User Control Pressed several times successively at regular intervals of a predetermined length (which will be referred to also as a "repeat interval" and is set to 500 ms, for example) while the key is held down. In addition, it is assumed that the TV 21 does not transmit User Control Released if the key on the remote controller Rc is released.

Figure 1:
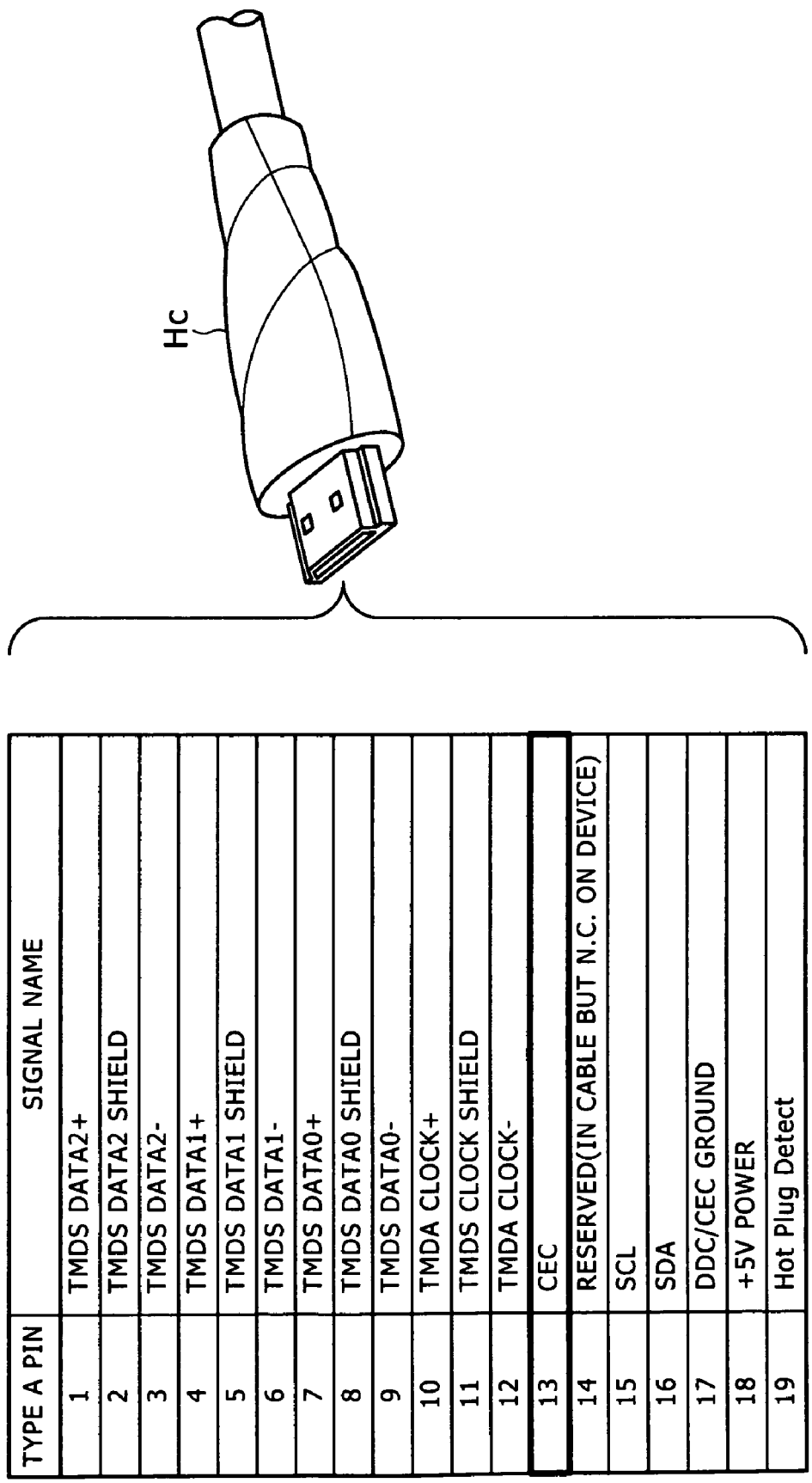
FIG. 1 shows HDMI pinout.
Figure 2:
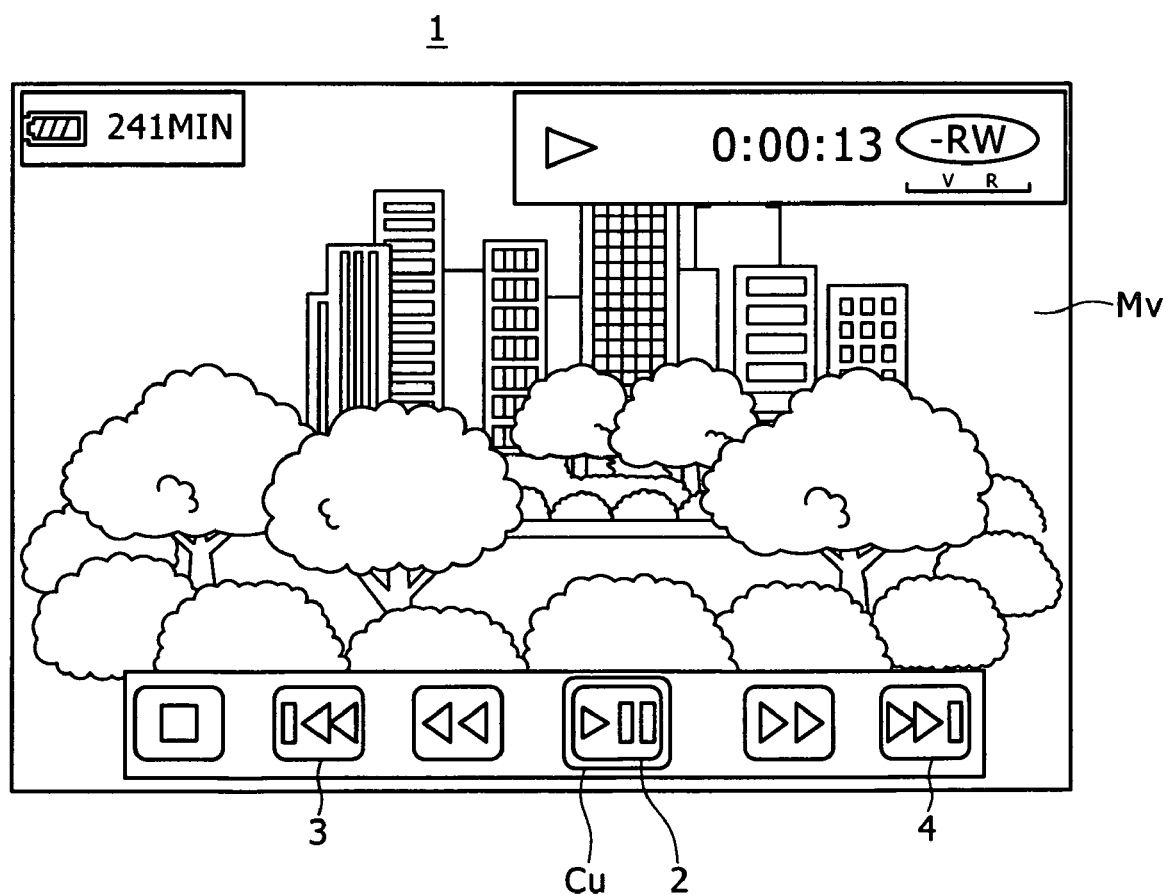
FIG. 2 shows one example of a playback control screen.
Figure 3:
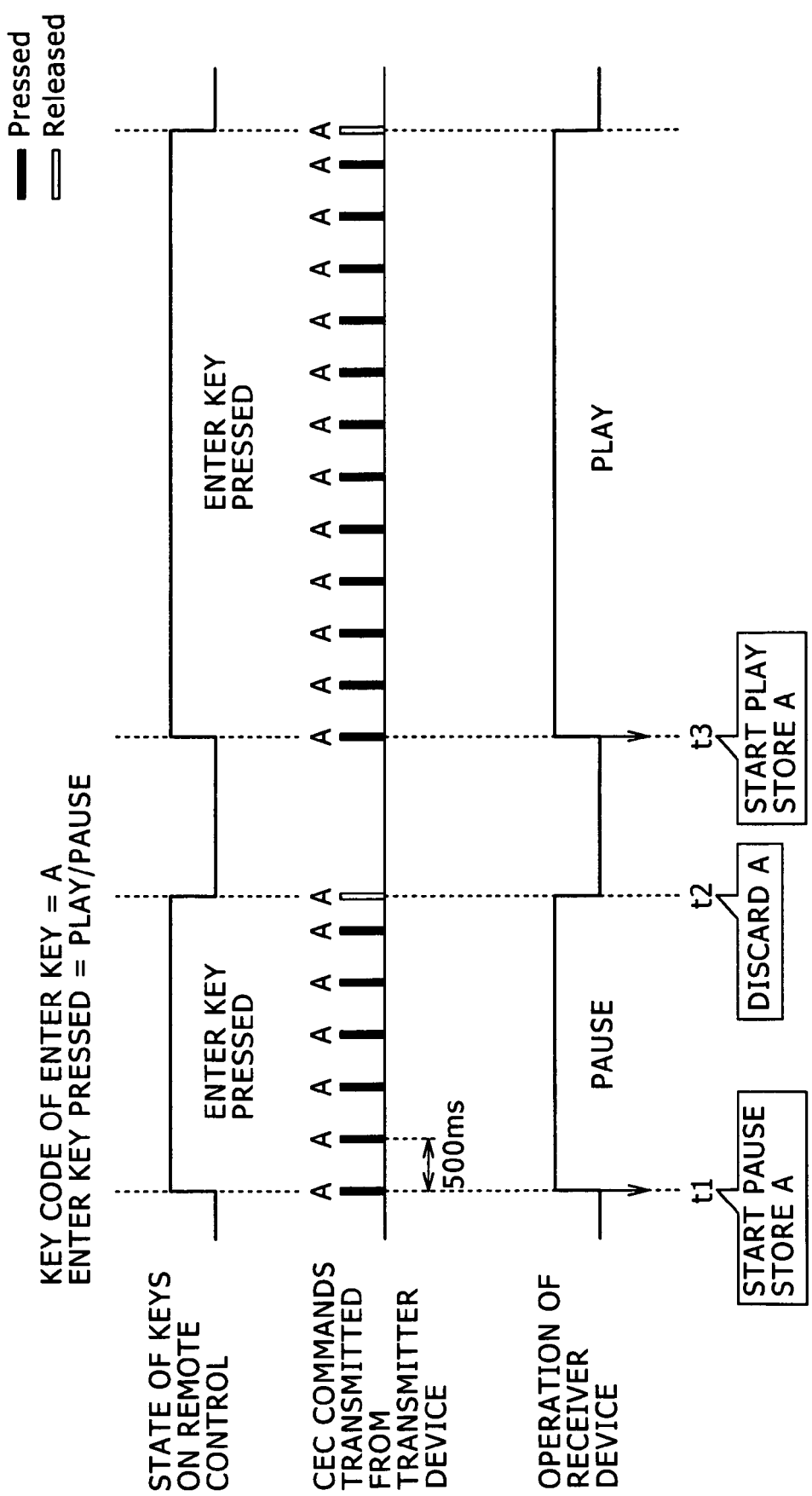
FIG. 3 is a timing diagram illustrating one example of an operation of a receiver device in related art, at the time of receiving CEC commands.
Figure 4:
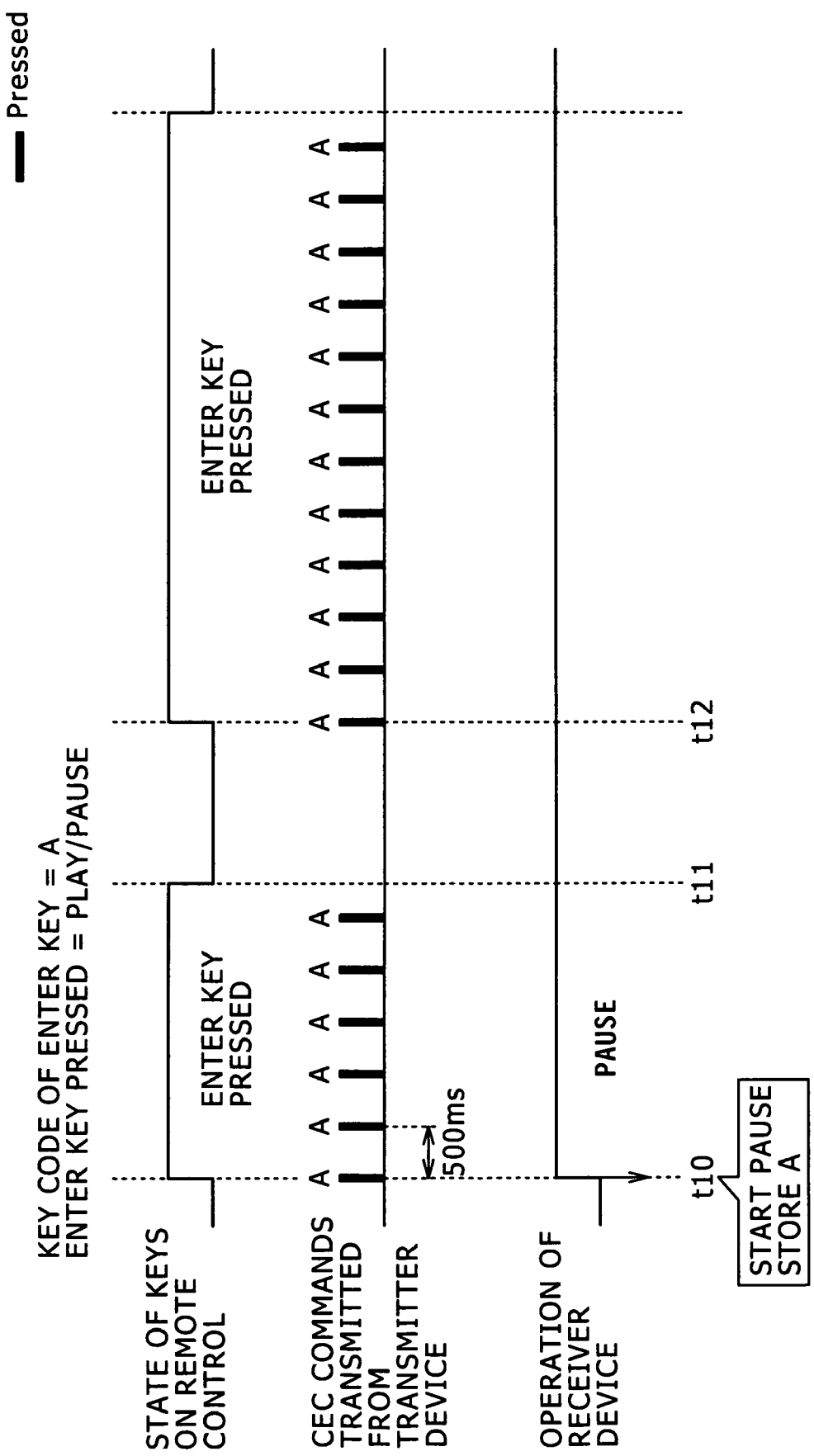
FIG. 4 is a timing diagram illustrating another example of an operation of the receiver device in related art, at the time of receiving the CEC commands.
Figure 5:
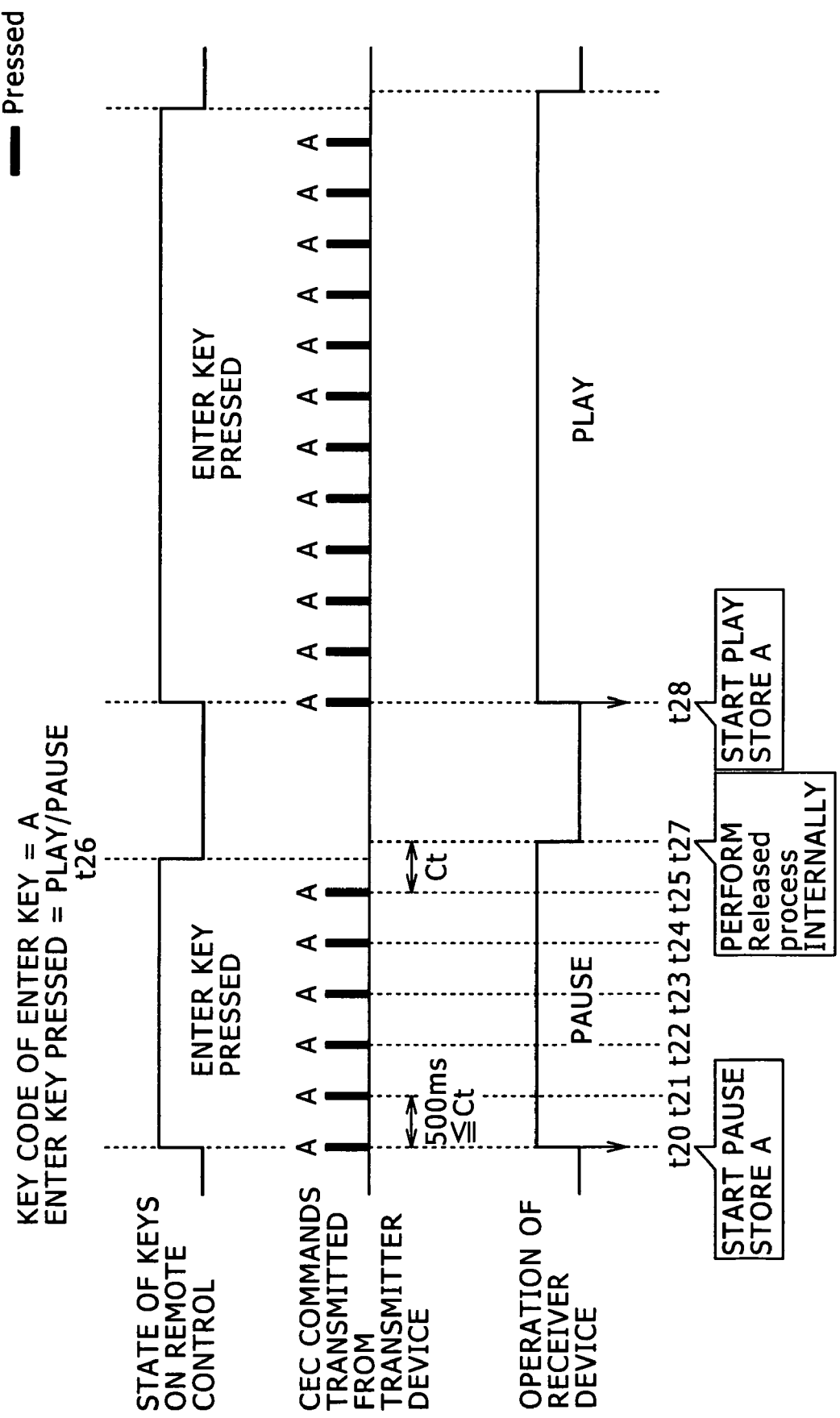
FIG. 5 is a timing diagram illustrating further example of an operation of the receiver device in related art, at the time of receiving the CEC commands.
Figure 6:
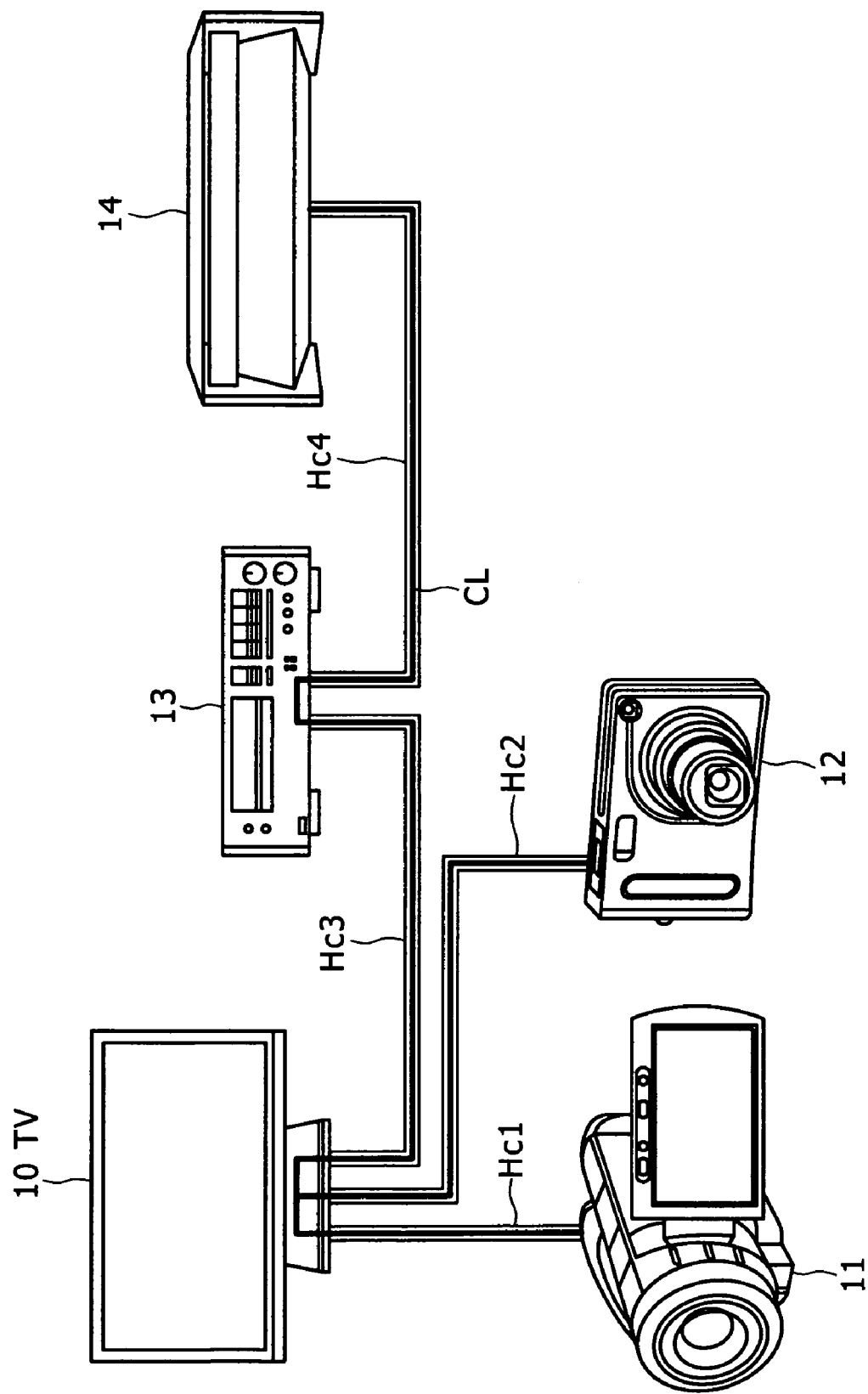
FIG. 6 illustrates a plurality of devices that are HDMI connected to one another.
Figure 7:
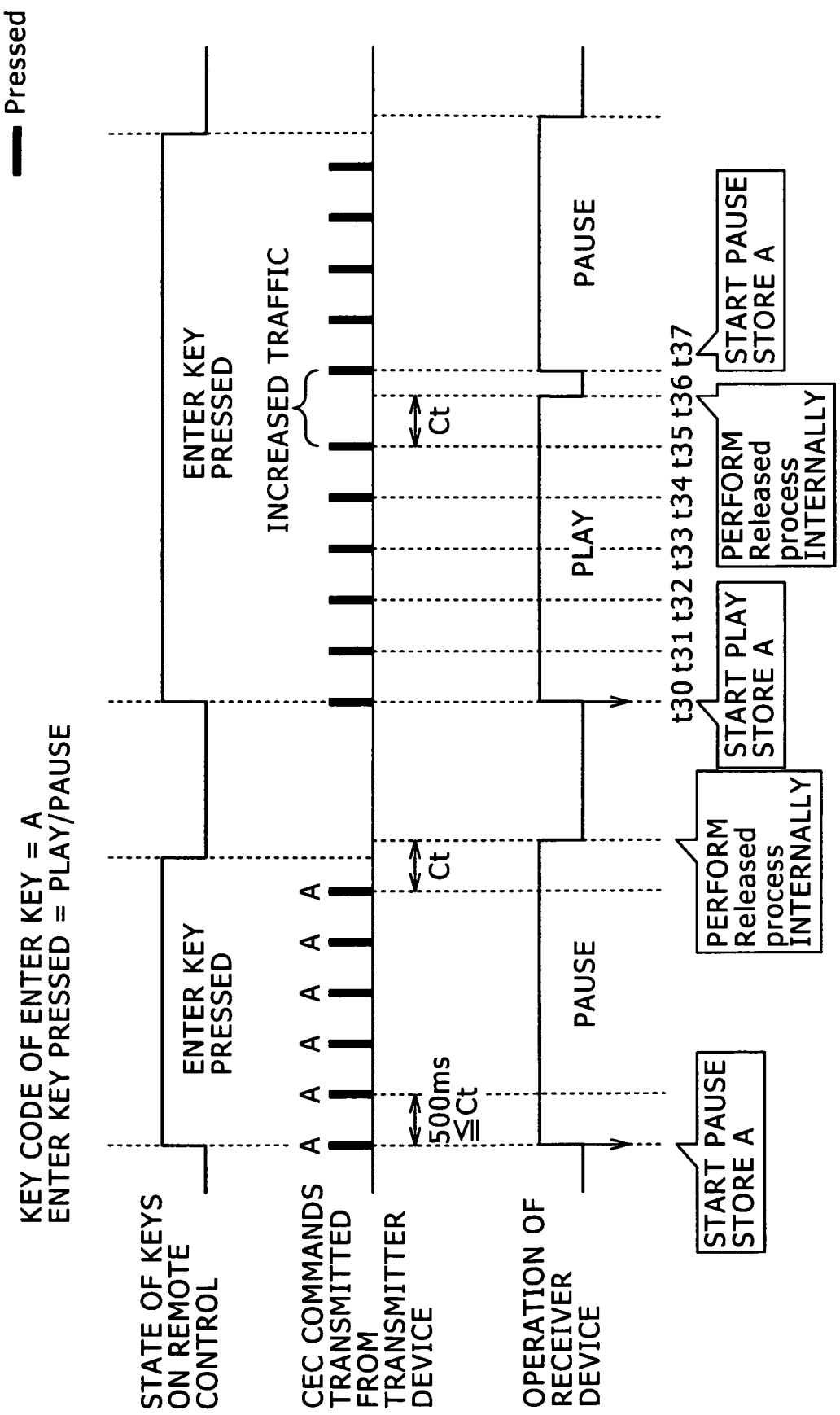
FIG. 7 is a timing diagram illustrating yet further example of an operation of the receiver device in related art, at the time of receiving the CEC commands.

Specifically, referring to a timing diagram of FIG. 13, which is substantially the same as that of FIG. 5, suppose that the enter key 45 on the remote controller Rc is pressed in a situation where the play/pause button 31 on the playback control screen 30 is selected by the cursor Cu, so that a key code (e.g., "0x00") of the enter key 45 and the User Control Pressed are transmitted from the TV 21 to the camcorder 22, and that the microprocessor 50 in the camcorder 22 receives the key code of the enter key 45 and the User Control Pressed at time t40. In this case, at time 40, the microprocessor 50 recognizes that the enter key 45 has been pressed in the situation where the play/pause button 31 is selected, and accordingly performs a controlling operation (e.g., pausing the playback of the HD video) in accordance with the instruction (e.g., the Pause instruction) associated with the pressing of the enter key 45 at this time, and stores the key code in the internal memory temporarily.

Thereafter, the microprocessor 50 in the camcorder 22 receives the User Control Pressed accompanied by the same key code again at time t41, which is within a command waiting period Ct from time t40, at which the microprocessor 50 received the first User Control Pressed. At time t41, the microprocessor 50 accordingly recognizes that the enter key is still held down, and ignores the User Control Pressed.

Thereafter, the microprocessor 50 in the camcorder 22 receives the User Control Pressed accompanied by the same key code several times (at times t42, t43, t44, and t45) within the command waiting period Ct from the previous receipt of the User Control Pressed (at times t41, t42, t43, and t44, respectively), but the microprocessor 50 similarly ignores the User Control Pressed each of these times.

Then, the enter key 45 is released at time t46, previous to a time at which the User Control Pressed is to be transmitted next (i.e., 500 ms after the last transmission of the User Control Pressed). At time t46, the TV 21 stops the transmission of the User Control Pressed.

Then, because the microprocessor 50 in the camcorder 22 does not receive the User Control Pressed accompanied by the same key code within the command waiting period Ct from time t45, at which the microprocessor 50 received the latest User Control Pressed, the microprocessor 50 recognizes that the enter key 45 has been released, at time t47, i.e., the command waiting period Ct after time t45.

Then, at time t47, the microprocessor 50 in the camcorder 22 internally performs a Released process. That is, the microprocessor 50 in the camcorder 22 discards (i.e., deletes) the key code temporarily stored in the internal memory.

Thereafter, the enter key 45 on the remote controller Rc is pressed again, so that the key code of the enter key 45 and the User Control Pressed are transmitted from the TV 21 to the camcorder 22, and the microprocessor 50 in the camcorder 22 receives the key code of the enter key 45 and the User Control Pressed at time t48. At time t48, the microprocessor 50 in the camcorder 22 recognizes that the enter key 45 has been pressed again, and accordingly performs a controlling operation (i.e., starting the playback of the HD video) in accordance with the instruction (which is the Playback instruction this time) associated with the pressing of the enter key at this time, and stores the key code temporarily.

As described above, the camcorder 22 internally performs the Released process if the camcorder 22 does not receive the User Control Pressed accompanied by the same key code again within the command waiting period Ct from the previous receipt of the User Control Pressed. Thus, even when HDMI connected to the TV 21, which does not transmit the User Control Released, the camcorder 22 is able to operate properly in accordance with the operation on the remote controller Rc.

The above description concerns the operation (i.e., a one-shot operation) of the camcorder 22 in the case where the instruction associated with the pressing of the key is an instruction that is preferably inputted only once for one key pressing, such as when the play/pause button 31 has been pressed. Note, however, that in the case where the instruction associated with the pressing of the key is an instruction that is preferably inputted again and again while the key is held down (e.g., the instruction for rewinding the HD video, the instruction for fast-forwarding the HD video, the instruction for switching the HD video, or the like), such as when the enter key 45 on the remote controller Rc has been pressed and held down in a situation where the next button 36 on the playback control screen 30 is selected by the cursor Cu, the camcorder 22 performs an operation in accordance with the instruction associated with the pressing of the key each time the camcorder 22 receives the User Control Pressed (i.e., performs a repetitive operation).

As noted previously, in the inter-device control system 20, the plurality of HDMI-connected devices are connected to one another via the single CEC line CL, so that any pair of HDMI-connected devices is capable of transmitting and receiving the CEC command therebetween.

Thus, because all the HDMI-connected devices share the single CEC line CL, issuance of multiple CEC commands at a time may increase traffic in the CEC line CL so greatly that a delay may occur in the transmission and reception of the CEC command.

If the delay occurs in the transmission and reception of the CEC command as described above, the TV 21 may fail to transmit the User Control Pressed the repeat interval (e.g., 500 ms) after the previous transmission of the User Control Pressed, for example. As a result, unless some measures are taken, the camcorder 22 may erroneously determine that the key has been released based on the fact that the camcorder 22 has not received the User Control Pressed within the command waiting period (e.g., 500 ms) from the previous receipt of the User Control Pressed, despite the fact that the key is still held down, for example.

As such, in the camcorder 22 according to the present embodiment, the delay in the transmission and reception of the CEC command due to the increased traffic is estimated, and the command waiting period Ct is adjusted based on the estimated delay.

Specifically, the camcorder 22 adjusts the command waiting period Ct in accordance with the number of devices in the inter-device control system 20, i.e., the number of devices that are connected to the single CEC line CL. The adjustment of the command waiting period Ct will now be described in detail below.

(1-5) Adjustment of Command Waiting Period Ct

When adjusting the command waiting period Ct, the camcorder 22 first detects the number of devices that are connected to the CEC line CL to which the camcorder 22 is connected. For this detection, a Polling Message, which is one of the CEC messages, is used, for example. Incidentally, the CEC commands described above (e.g., the User Control Pressed) are also CEC messages.

The CEC message will now be briefly described below. Referring to FIG. 14A, the CEC message has a data frame composed of: a Start Bit, which indicates the top of the CEC message; a Header Block, which follows the Start Bit; and a plurality of Data Blocks, which follow the Header Block. The number of Data Blocks is between 1 and 15 both inclusive.

The Header Block is a Block in which information indicating a source and a destination of the CEC message is described. The Header Block is composed of: Initiator, which is 4 bits long and represents a device ID (which will be described later) of the source; Destination, which is 4 bits long and represents a device ID of the destination; EOM (End Of Message), which is 1 bit long and indicates whether this Block is at the end of the CEC message; and ACK (Acknowledgement), which is 1 bit long and indicates acknowledgement from the destination. The Data Block is a Block in which various data (e.g., the CEC command) is described. The Data Block is composed of: Data, which is 8 bits long and represents the various data; EOM, which is 1 bit long; and ACK, which is 1 bit long.

The CEC message exchanged between devices is a signal composed of the Start Bit and a bit sequence composed of zeros and ones. Referring to FIG. 14B, the Start Bit is represented by a waveform that starts with a low level that lasts for 3.7±0.2 ms, followed by a high level that lasts until a period of 4.5±0.2 ms elapses since the start of the waveform. Bit 0 is represented by a waveform that starts with the low level that lasts for 1.5±0.2 ms, followed by the high level that lasts until a period of 2.4±0.2 ms elapses since the start of the waveform. Bit 1 is represented by a waveform that starts with the low level that lasts for 0.6±0.2 ms, followed by the high level that lasts until a period of 2.4±0.2 ms elapses since the start of the waveform.

The CEC message can be received by all the devices connected to the CEC line CL. Therefore, each device that receives the CEC message determines whether it is the destination of the CEC message received, by determining whether the device ID of the destination as described in the Header Block of the CEC message corresponds to its own device ID.

In the HDMI, as shown in FIG. 15, sixteen logical addresses, "0" to "15," are prepared beforehand as device IDs. The HDMI standard specifies that each device should acquire one of the sixteen Logical Addresses when establishing HDMI connection.

That is, the transmission and reception of the CEC message between the devices is achieved by the transmitter device describing its own Logical Address in the Initiator in the Header Block and describing the Logical Address of the destination in the Destination in the Header Block.

The Polling Message is one of the CEC messages, and used for recognition of the device connected to the CEC line CL. The Polling Message is composed of only the Start Bit and the Header Block.

A device that initiates the Polling Message, i.e., the source of the Polling Message, describes a desired Logical Address in the Destination in the Header Block, and issues the Polling Message.

Figure 16A:
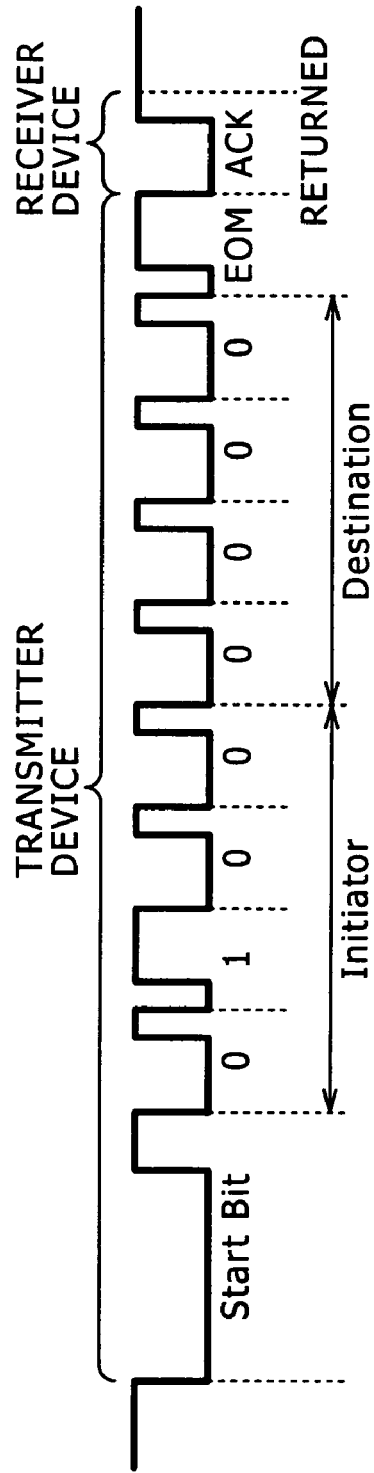
FIGS. 16A and 16B illustrate the structure of a Polling Message.

Here, if a device that has acquired that Logical Address is present on the CEC line CL, this device returns ACK in response to receipt of the Polling Message, as illustrated in FIG. 16A.

Figure 16B:
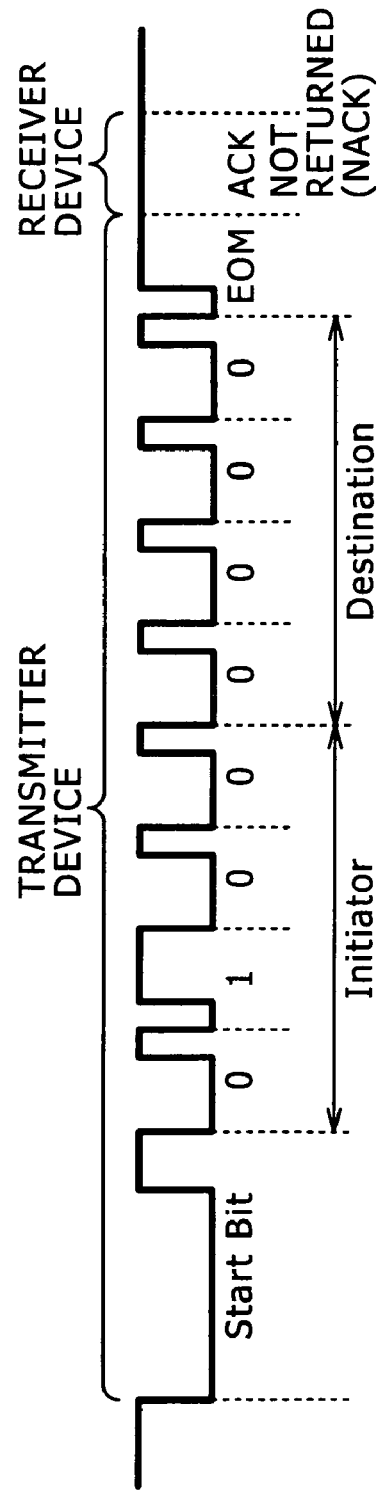

Meanwhile, if the device that has acquired that Logical Address is not present on the CEC line CL, ACK is not returned to the source of the Polling Message, as illustrated in FIG. 16B.

Thus, use of the Polling Message makes it possible to recognize whether the device corresponding to the Logical Address described in the Polling Message is connected to the CEC line CL.

The camcorder 22 issues the Polling Message to one Logical Address after another and counts the number of devices that have returned ACK, thereby detecting the number of devices that are connected to the CEC line CL.

Note here that while the Logical Addresses, "0" to "15," are prepared, the Logical Address "15" represents an invalid device or all devices, and that therefore the Polling Message is not issued to the Logical Address "15."

After detecting the number of devices that are connected to the CEC line CL in the above-described manner using the Polling Messages, the camcorder 22 adjusts the command waiting period Ct in accordance with the number.

Specifically, before shipment of the camcorder 22, the traffic in the CEC line CL is verified several times while varying the number of devices connected to the camcorder 22 via the CEC line CL, for example. Based on the traffic estimated for each possible number of connected devices, an adjustment value for the command waiting period Ct is set in the camcorder 22 for each possible number of connected devices.

In other words, based on estimated delays in the transmission and reception of the CEC command due to the increased traffic, adjustment values that will be used to extend the command waiting period Ct by at least an amount of time corresponding to the delay are set in the camcorder 22.

Specifically, referring to FIG. 17, for example, the adjustment value for the command waiting period Ct is set to "0" (i.e., the command waiting period Ct should be maintained at a default value (initial value) of 500 ms) for the case where the number of devices connected to the CEC line CL, inclusive of the camcorder 22, is 2, i.e., the case where only the camcorder 22 and one other device are connected to the CEC line CL, assuming that the traffic will not exert an influence on transfer of the CEC command.

Further, the adjustment value for the command waiting period Ct is set to "+300 ms" for the case where the number of connected devices is 3 to 5, based on an estimated delay in the transmission and reception of the CEC command due to an increase in the traffic that is predicted in this case. That is, the command waiting period Ct will be set to 800 ms, i.e., the sum of the default value and 300 ms, in that case.

Still further, the adjustment value for the command waiting period Ct is set to "+400 ms" for the case where the number of connected devices is 6 to 9, based on an estimated delay in the transmission and reception of the CEC command due to an increase in the traffic that is predicted in this case. That is, the command waiting period Ct will be set to 900 ms, i.e., the sum of the default value and 400 ms, in that case.

Still further, the adjustment value for the command waiting period Ct is set to "+500 ms" for the case where the number of connected devices is 10 or greater, based on an estimated delay in the transmission and reception of the CEC command due to an increase in the traffic that is predicted in this case. That is, the command waiting period Ct will be set to 1000 ms, i.e., the sum of the default value and 500 ms, in that case.

Based on the adjustment values set in the above-described manners, the camcorder 22 adjusts the command waiting period Ct in accordance with the number of devices connected to the CEC line CL.

The operation of the camcorder 22 will now be described below in the case where the number of devices connected to the CEC line CL is five, inclusive of the camcorder 22, as illustrated in FIG. 8. In this case, the command waiting period Ct is set to 800 ms, i.e., the sum of the default value and 300 ms, as described above, for example.

Figure 18:
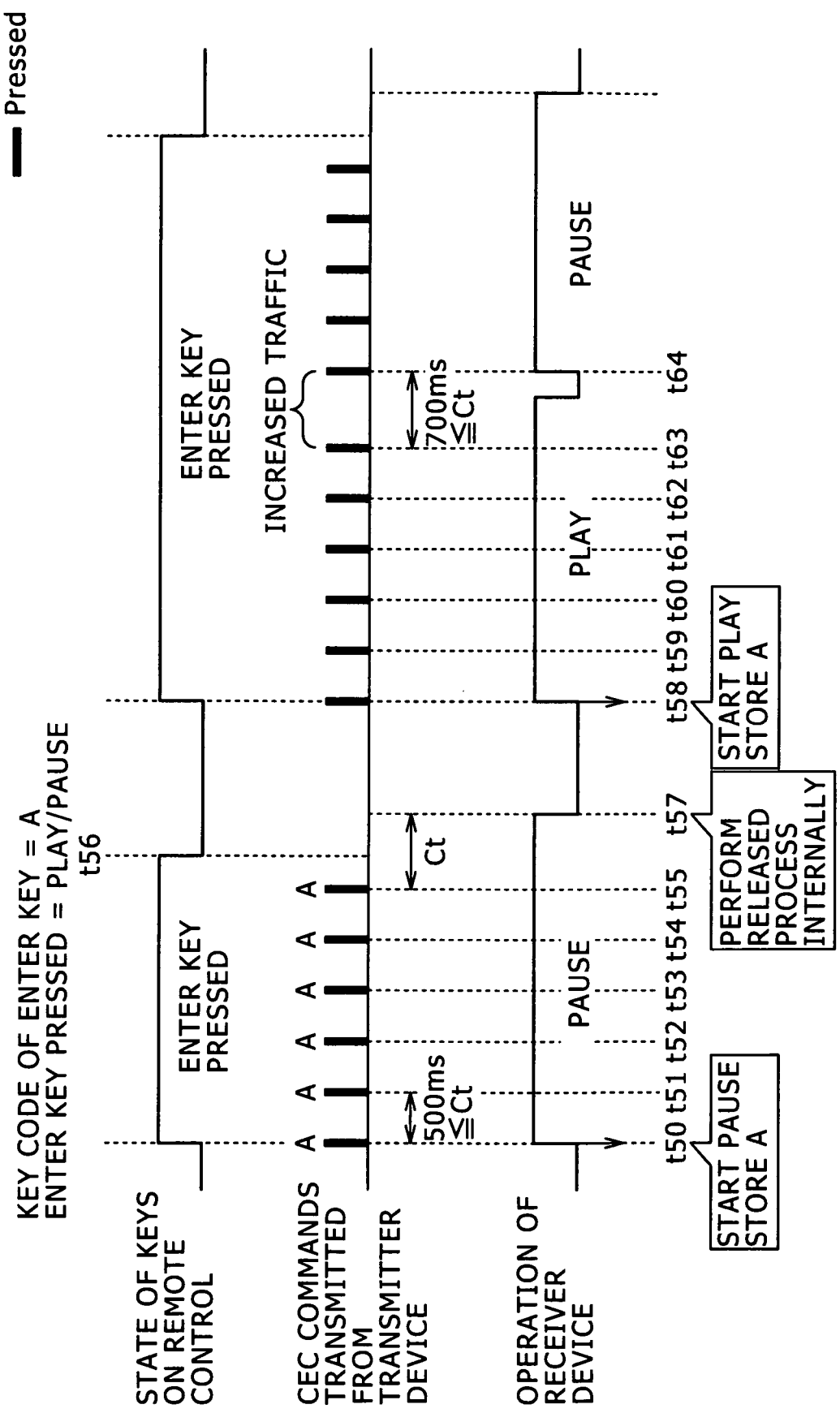
FIG. 18 is a timing diagram illustrating another example of the operation of the camcorder at the time of receiving the CEC commands according to the first embodiment.

Referring to a timing diagram of FIG. 18, suppose that the enter key 45 on the remote controller Rc is pressed in the situation where the play/pause button 31 on the playback control screen 30 is selected by the cursor Cu, so that the key code (e.g., "0x00") of the enter key 45 and the User Control Pressed are transmitted from the TV 21 to the camcorder 22, and that the microprocessor 50 in the camcorder 22 receives the key code of the enter key 45 and the User Control Pressed at time t50. At time t50, the microprocessor 50 recognizes that the enter key 45 has been pressed in the situation where the play/pause button 31 is selected, and accordingly performs a controlling operation (e.g., pausing the playback of the HD video) in accordance with the instruction (e.g., the Pause instruction) associated with the pressing of the enter key 45 at this time, and stores the key code in the internal memory temporarily.

Thereafter, the microprocessor 50 in the camcorder 22 receives the User Control Pressed accompanied by the same key code again at time t51, which is within the command waiting period Ct from time t50, at which the microprocessor 50 received the first User Control Pressed. At time t51, the microprocessor 50 recognizes that the enter key is still held down, and accordingly ignores the User Control Pressed.

Thereafter, the microprocessor 50 in the camcorder 22 receives the User Control Pressed accompanied by the same key code several times (at times t52, t53, t54, and t55) within the command waiting period Ct from the previous receipt of the User Control Pressed (at times t51, t52, t53, and t54, respectively), but the microprocessor 50 similarly ignores the User Control Pressed each of these times.

Then, the enter key 45 is released at time t56, previous to a time at which the User Control Pressed is to be transmitted next (i.e., 500 ms after the last transmission of the User Control Pressed). At time t56, the TV 21 stops the transmission of the User Control Pressed.

Then, because the microprocessor 50 in the camcorder 22 does not receive the User Control Pressed accompanied by the same key code within the command waiting period (800 ms) Ct from time t55, at which the microprocessor 50 received the latest User Control Pressed, the microprocessor 50 recognizes that the enter key 45 has been released, at time t57, i.e., the command waiting period Ct after time t55.

Then, at time t57, the microprocessor 50 in the camcorder 22 performs the Released process. That is, the microprocessor 50 in the camcorder 22 discards (i.e., deletes) the key code temporarily stored in the internal memory.

Thereafter, the enter key 45 on the remote controller Rc is pressed again, so that the key code of the enter key 45 and the User Control Pressed are transmitted from the TV 21 to the camcorder 22, and the microprocessor 50 in the camcorder 22 receives the key code of the enter key 45 and the User Control Pressed at time t58. At time t58, the microprocessor 50 in the camcorder 22 recognizes that the enter key 45 has been pressed again, and accordingly performs a controlling operation (i.e., starting the playback of the HD video) in accordance with the instruction (which is the Playback instruction this time) associated with the pressing of the enter key at this time, and stores the key code temporarily.

Thereafter, the microprocessor 50 in the camcorder 22 receives the User Control Pressed accompanied by the same key code again at time t59, which is within the command waiting period Ct from time t58, at which the microprocessor 50 received the first User Control Pressed. At time t59, the microprocessor 50 recognizes that the enter key is still held down, and accordingly ignores the User Control Pressed.

Thereafter, the microprocessor 50 in the camcorder 22 receives the User Control Pressed accompanied by the same key code several times (at times t60, t61, t62, and t63) within the command waiting period Ct from the previous receipt of the User Control Pressed (at times t59, t60, t61, and t62, respectively), but the microprocessor 50 similarly ignores the User Control Pressed each of these times.

It is assumed here that due to an increase in the traffic in the CEC line CL, the TV 21 transmits next User Control Pressed later than a time at which it is expected to be transmitted (i.e., 500 ms after the last transmission of the User Control Pressed), e.g., 700 ms after the last transmission of the User Control Pressed.

At this time, the command waiting period Ct set in the camcorder 22 is 800 ms, i.e., the sum of the default value and 300 ms, based on the previously estimated delay in the transmission of the CEC command.

Therefore, even though a delay occurs in the transmission of the User Control Pressed due to the influence of the traffic, the microprocessor 50 in the camcorder 22 receives the User Control Pressed, which arrives at the microprocessor 50 at a delayed time, at time t64, which is within the command waiting period Ct from the previous receipt of the User Control Pressed. As a result, the microprocessor 50 properly recognizes that the enter key 45 is still held down, and accordingly ignores the User Control Pressed properly.

On the other hand, suppose here that the microprocessor 50 in the camcorder 22 does not receive the User Control Pressed within the adjusted command waiting period Ct from the previous receipt of the User Control Pressed. In this case, the microprocessor 50 will properly recognize that the enter key 45 has been released, and accordingly perform the Released process properly.

As described above, the camcorder 22 adjusts the command waiting period Ct using one of the adjustment values that have previously been set based on the estimated traffic with respect to each possible number of devices connected to the CEC line CL. As a result, even if a delay occurs in the transmission of the User Control Pressed from the TV 21 due to the influence of the traffic, the camcorder 22 is able to properly recognize that the key on the remote controller Rc is still held down or that the key has been released, and accordingly operate properly in accordance with the operation on the remote controller Rc.

That is, the camcorder 22 is capable of always operating regularly regardless of the traffic in the CEC line CL.

(1-6) Number-of-Connected-Devices Detecting Procedure

Figure 19:
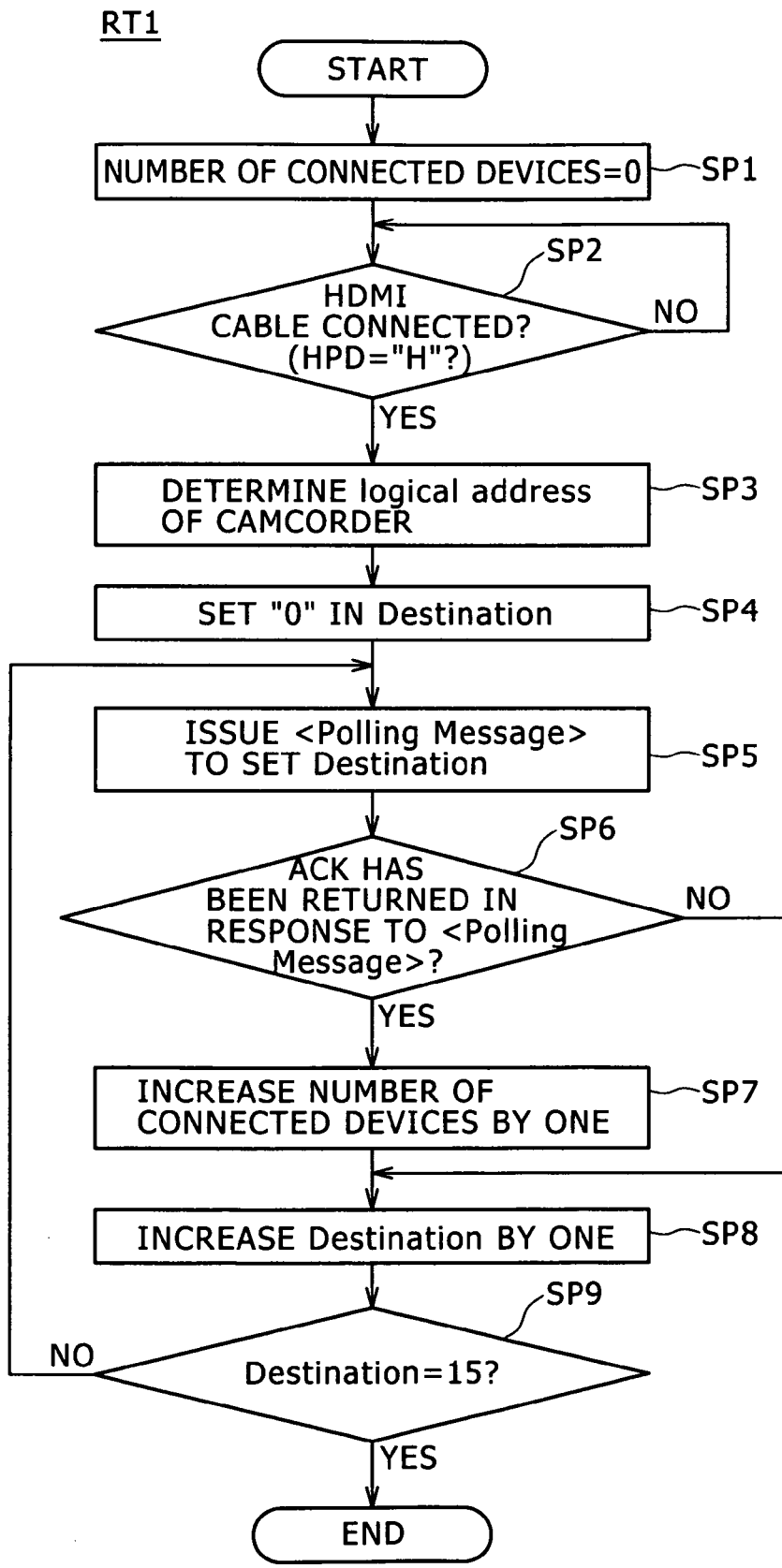
FIG. 19 is a flowchart illustrating a number-of-connected-devices detecting procedure according to the first embodiment.

Next, referring to a flowchart as shown in FIG. 19, a procedure performed by the camcorder 22 for detecting the number of devices connected to the CEC line CL will now be described in detail below. This procedure will be hereinafter referred to also as a "number-of-connected-devices detecting procedure" as appropriate. The number-of-connected-devices detecting procedure is a procedure performed by the microprocessor 50 in the camcorder 22 in accordance with a program designed for detecting the number of connected devices as read from the internal memory or the hard disk drive 51.

Upon activation of the camcorder 22, for example, the microprocessor 50 in the camcorder 22 starts a number-of-connected-devices detecting procedure RT1, and proceeds to step SP1. At step SP1, the microprocessor 50 sets the number of connected devices to "0," and proceeds to step SP2.

At step SP2, the microprocessor 50 waits until the camcorder 22 is HDMI connected to another device. Here, the microprocessor 50 determines whether the camcorder 22 has been HDMI connected to any other device, based on whether a signal that is inputted to the camcorder 22 over Hot Plug Detect, which is a signal line within the HDMI cable Hc, has been changed to High, for example.

If the microprocessor 50 recognizes that the camcorder 22 has been HDMI connected to any other device, the microprocessor 50 proceeds to step SP3. At step SP3, the microprocessor 50 acquires one of the sixteen Logical Addresses to determine the Logical Address of the camcorder 22, and proceeds to step SP4.

At step SP4, the microprocessor 50 sets the top Logical Address "0" in the Destination, which represents the destination of the Polling Message, and proceeds to step SP5.

At step SP5, the microprocessor 50 issues the Polling Message to the set Destination, and proceeds to step SP6. At step SP6, the microprocessor 50 determines whether ACK has been returned in response to the Polling Message issued at step SP5.

If it is determined at step SP6 that ACK has been returned in response to the Polling Message issued at step SP5, that means that there is a device on the CEC line CL corresponding to the set Destination, and the microprocessor 50 proceeds to step SP7. At step SP7, the microprocessor 50 increases the number of connected devices by one, and proceeds to step SP8.

Meanwhile, if it is determined at step SP6 that ACK has not been returned in response to the Polling Message issued at step SP5, that means that there is not a device on the CEC line CL corresponding to the set Destination, and the microprocessor 50 proceeds to step SP8, while maintaining the number of connected devices.

At step SP8, the microprocessor 50 increases the Destination by one, i.e., sets the destination of the Polling Message to a next Logical Address, and proceeds to step SP9.

At step SP9, the microprocessor 50 determines whether the Destination is set at the last Logical Address "15." If it is determined at step SP9 that the Destination is not set at the last Logical Address "15," that means that the Polling Messages have not been issued to all of the Logical Addresses "0" to "14" yet, and the microprocessor 50 returns to step SP5.

Meanwhile, if it is determined at step SP9 that the Destination is set at the last Logical Address "15," that means that the Polling Messages have been already issued to all of the Logical Addresses "0" to "14," and the microprocessor 50 stores the number of connected devices at the time (i.e., the number of devices connected to the CEC line CL) in the internal memory, for example, and ends the number-of-connected-devices detecting procedure RT1.

The microprocessor 50 in the camcorder 22 detects the number of devices connected to the CEC line CL in accordance with the number-of-connected-devices detecting procedure RT1 as described above.

Note that the processes of steps SP5 and SP6 may be omitted when the Destination is the Logical Address of the camcorder 22. In that case, a useless process of the camcorder 22 issuing the Polling Message to the camcorder 22 itself can be omitted.

(1-7) Operational Procedure at Time of Receipt of CEC Commands

Figure 20:
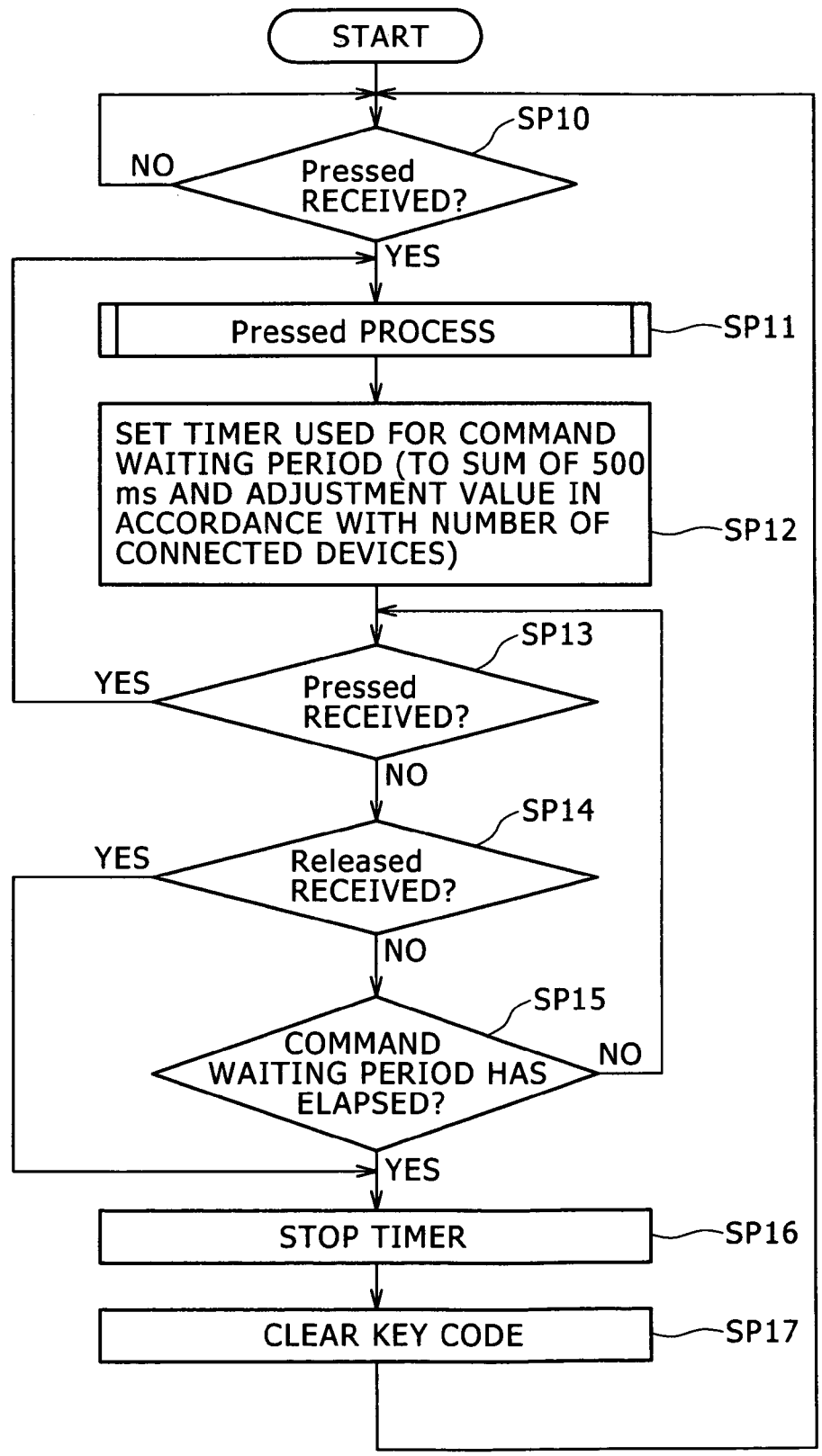
FIG. 20 is a flowchart illustrating an operational procedure according to the first embodiment.
Figure 21:
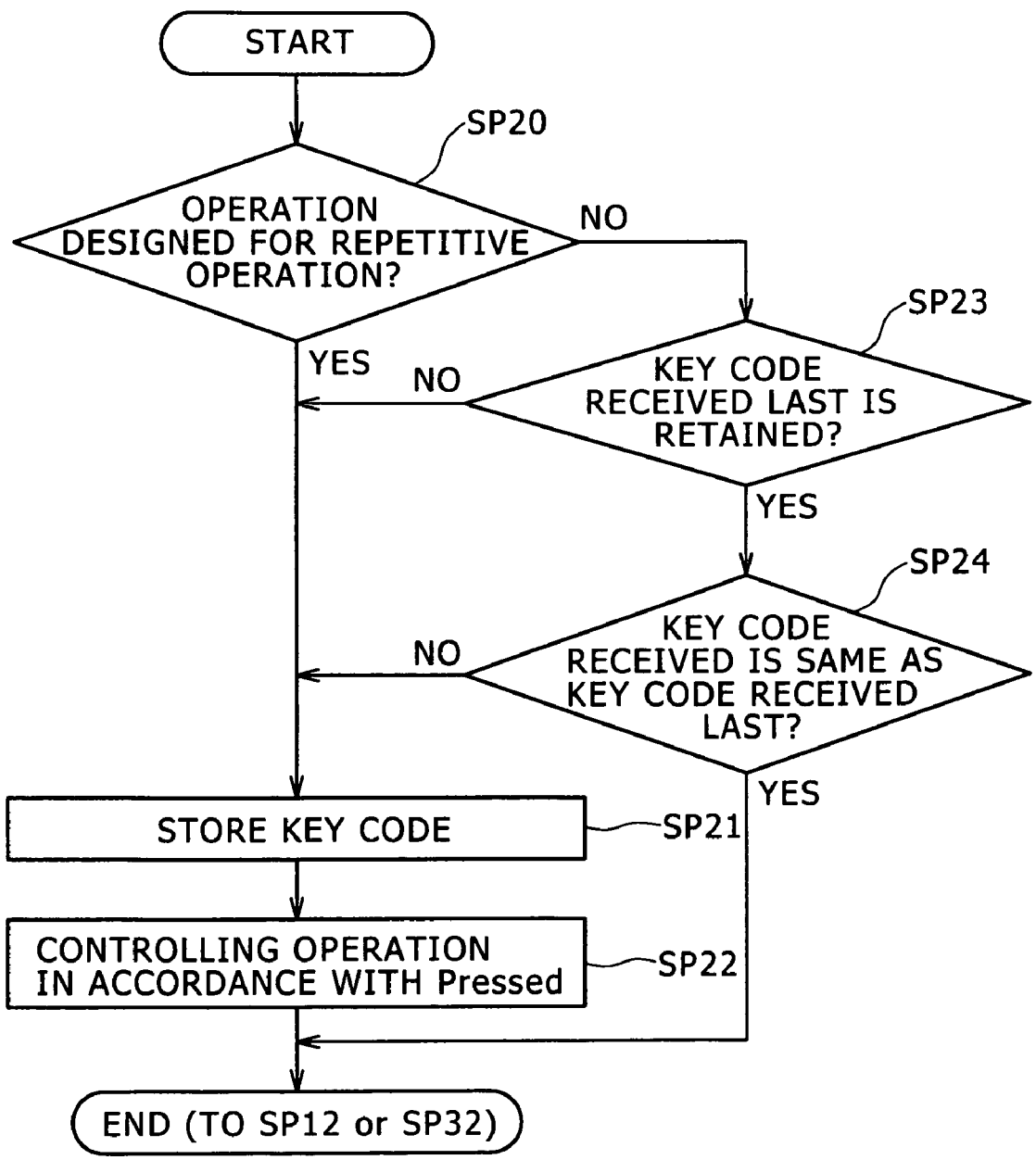
FIG. 21 is a flowchart illustrating Pressed procedure according to the first embodiment.

Next, an operational procedure when the camcorder 22 receives the CEC commands will now be described in detail below with reference to flowcharts as shown in FIGS. 20 and 21. This operational procedure is a procedure performed by the microprocessor 50 in the camcorder 22 in accordance with an operation program as read from the internal memory or the hard disk drive 51.

After completing the number-of-connected-devices detecting procedure RT1 as described above, for example, the microprocessor 50 in the camcorder 22 starts this operational procedure RT2, and proceeds to step SP10. At step SP10, the microprocessor 50 waits for receipt of the User Control Pressed.

If the microprocessor 50 receives the User Control Pressed, the microprocessor 50 proceeds to step SP11, and performs a process to be performed at the time of the receipt of the User Control Pressed (this process will be referred to also as "Pressed process" as appropriate).

A procedure RT3 of the Pressed process (this procedure will be referred to also as "Pressed procedure" as appropriate) is illustrated in FIG. 21. After starting the Pressed procedure RT3, the microprocessor 50 determines at step SP20 whether the operation which has been performed on the remote controller Rc at this time and corresponds to the received User Control Pressed is an operation designed for the repetitive operation.

If it is determined at step SP20 that the operation which has been performed on the remote controller Rc at this time and corresponds to the received User Control Pressed is an operation designed for the repetitive operation, the microprocessor 50 proceeds to step SP21.

At step SP21, the microprocessor 50 temporarily stores the key code received together with the User Control Pressed, and proceeds to step SP22. At step SP22, the microprocessor 50 performs a controlling operation corresponding to the operation that has been performed on the remote controller Rc at this time and corresponds to the received User Control Pressed, and ends the Pressed procedure RT3.

Meanwhile, if it is determined at step SP20 that the operation which has been performed on the remote controller Rc at this time and corresponds to the received User Control Pressed is not an operation designed for the repetitive operation, that means that the operation which has been performed on the remote controller Rc at this time and corresponds to the received User Control Pressed is an operation designed for the one-shot operation, and the microprocessor 50 proceeds to step SP23.

At step SP23, the microprocessor 50 determines whether any key code received together with the User Control Pressed is temporarily stored in the internal memory, i.e., whether the key code that accompanied the User Control Pressed received last is retained in the internal memory. If it is determined at step SP23 that the key code that accompanied the User Control Pressed received last is retained in the internal memory, that means that the User Control Pressed's have been received successively, and the microprocessor 50 proceeds to step SP24.

At step SP24, the microprocessor 50 determines whether the User Control Pressed received this time has the same key code that accompanied the User Control Pressed received last. If it is determined at step SP24 that the User Control Pressed received this time has the same key code that accompanied the User Control Pressed received last, that means that the User Control Pressed received this time has been transmitted as a result of the key on the remote controller Rc being held down continuously, and the microprocessor 50 accordingly ignores the User Control Pressed received this time and ends the Pressed procedure RT3.

Meanwhile, if it is determined at step SP23 that the key code that accompanied the User Control Pressed received last is not retained in the internal memory, that means that the User Control Pressed received this time is the first User Control Pressed that has been transmitted after the processing of the current key, and the microprocessor 50 proceeds to step SP21.

If it is determined at step SP24 that the User Control Pressed received this time does not have the same key code that accompanied the User Control Pressed received last, that means that the key pressed this time is different from the key pressed last, and the microprocessor 50 proceeds to step SP21.

After performing the Pressed process in accordance with the Pressed procedure RT3 as described above, the microprocessor 50 proceeds to step SP12 (see FIG. 20).

At step SP12, the microprocessor 50 sets a timer used for the command waiting period Ct to the sum of the default value (500 ms) and the adjustment value in accordance with the number of connected devices as detected by the number-of-connected-devices detecting procedure, and starts the timer. Then, the microprocessor 50 proceeds to step SP13.

At step SP13, the microprocessor 50 determines whether the User Control Pressed has been received within the command waiting period Ct. If it is determined at step SP13 that the User Control Pressed has been received within the command waiting period Ct, the microprocessor 50 returns to step SP11, and performs the Pressed process.

Meanwhile, if it is determined at step SP13 that the User Control Pressed has not been received within the command waiting period Ct, the microprocessor 50 proceeds to step SP14. At step SP14, the microprocessor 50 determines whether the User Control Released has been received within the command waiting period Ct. If it is determined at step SP14 that the User Control Released has not been received within the command waiting period Ct, the microprocessor 50 proceeds to step SP15.

At step SP15, the microprocessor 50 determines whether the command waiting period Ct has elapsed, based on an elapsed time obtained from the timer. If it is determined at step SP15 that the command waiting period Ct has not elapsed yet, the microprocessor 50 returns to step SP13.

Meanwhile, if it is determined at step SP15 that the command waiting period Ct has elapsed, that means that the command waiting period Ct has elapsed since the last receipt of the User Control Pressed without the microprocessor 50 receiving the User Control Pressed or the User Control Released, and the microprocessor 50 proceeds to step SP16.

If it is determined at step SP14 that the User Control Released has been received within the command waiting period Ct, the microprocessor 50 proceeds to step SP16.

At step SP16, the microprocessor 50 stops the timer, and proceeds to step SP17. At step SP17, the microprocessor 50 determines that the key has been released, and accordingly discards (i.e., clears) the key code temporarily stored. Then, the microprocessor 50 returns to step SP10, and waits for the receipt of the User Control Pressed.

The microprocessor 50 in the camcorder 22 is configured to operate in accordance with the operational procedure RT2 as described above.

(1-8) Operation and Effects of First Embodiment

According to the first embodiment of the present invention, after establishing the HDMI connection, the camcorder 22 detects the number of devices connected to the CEC line CL using the Polling Message, which is one of the CEC messages.

Then, in accordance with the number of connected devices detected, the camcorder 22 adjusts the command waiting period Ct, which occurs when the remote controller Rc of the TV 21 is operated, using an appropriate one of the adjustment values that have been previously set for possible numbers of connected devices based on the estimated traffic.

That is, the traffic generally increases as the number of connected devices increases. The delay in the transmission of the CEC command which is expected to occur due to the increased traffic is estimated. The camcorder 22 extends the command waiting period Ct to such an extent that the camcorder 22 will be able to receive the CEC command within the command waiting period Ct despite the delayed transmission of the CEC command.

Thus, even if a delay occurs in the transmission of the User Control Pressed from the TV 21 due to the influence of the traffic, the camcorder 22 is able to properly recognize that the key on the remote controller Rc is still held down or that the key on the remote controller Rc has been released, and accordingly operate properly in accordance with the operation on the remote controller Rc.

That is, the camcorder 22 is capable of always operating regularly regardless of the traffic in the CEC line CL.

According to the first embodiment, the command waiting period Ct is adjusted based on the traffic in the CEC line CL, and when a delay is likely to occur in the transmission of the User Control Pressed due to the increased traffic in the CEC line CL, the camcorder 22 waits for the receipt of the User Control Pressed or the User Control Released within the thus extended command waiting period Ct, and determines whether or not to perform the Released process based on whether or not the User Control Pressed or the User Control Released has been received within the extended command waiting period Ct. In such a manner, the camcorder 22 is capable of operating regularly based on the CEC command from another device, regardless of the traffic in the CEC line CL.

(2) Second Embodiment

Next, a second embodiment of the present invention will now be described below. The second embodiment is different from the first embodiment in method of adjusting the command waiting period Ct, but similar to the first embodiment in other respects, such as the structure of the inter-device control system 20 and the structure of the camcorder 22. Thus, the following description centers around the adjustment of the command waiting period Ct.

In the second embodiment, the command waiting period Ct is not adjusted in accordance with the estimated traffic in the CEC line CL based on the number of connected devices. Instead, the traffic in the CEC line CL is actually monitored, and the command waiting period Ct is adjusted in accordance with the current traffic.

(2-1) Operation of Camcorder 22 in Accordance with CEC Commands

Figure 22:
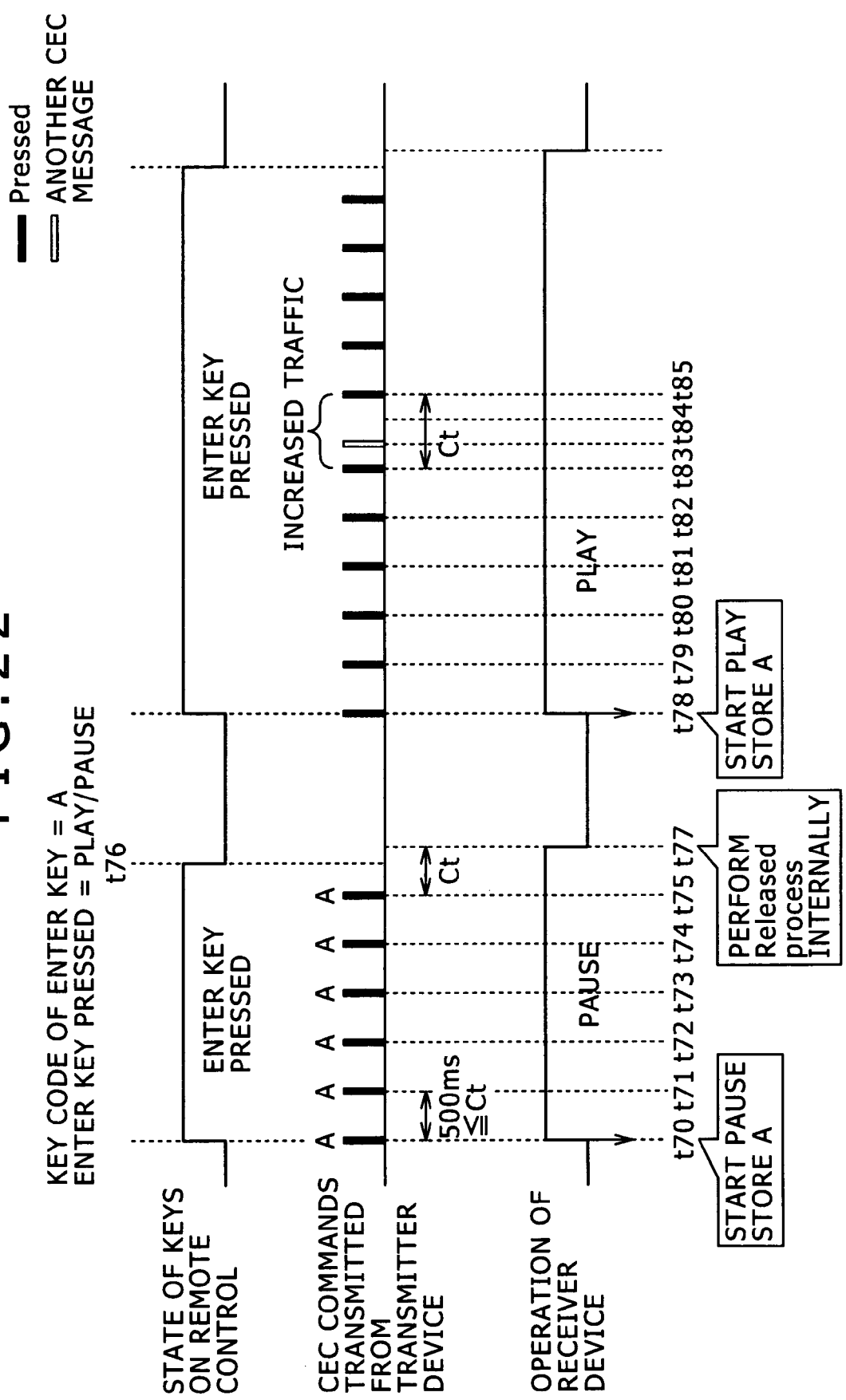
FIG. 22 is a timing diagram illustrating an operation of the camcorder at the time of receiving the CEC commands according to a second embodiment of the present invention.

Here, the operation of the camcorder 22 according to the second embodiment will now be described below. Referring to a timing diagram of FIG. 22, suppose that the enter key 45 on the remote controller Rc is pressed in the situation where the play/pause button 31 on the playback control screen 30 is selected by the cursor Cu, so that the key code (e.g., "0x00") of the enter key 45 and the User Control Pressed are transmitted from the TV 21 to the camcorder 22, and that the microprocessor 50 in the camcorder 22 receives the key code of the enter key 45 and the User Control Pressed at time t70. In this case, at time 70, the microprocessor 50 recognizes that the enter key 45 has been pressed in the situation where the play/pause button 31 is selected, and accordingly performs a controlling operation (e.g., pausing the playback of the HD video) in accordance with the instruction (e.g., the Pause instruction) associated with the pressing of the enter key 45 at this time, and stores the key code in the internal memory temporarily.

In addition, at time t70, the microprocessor 50 starts monitoring the traffic in the CEC line CL.

Thereafter, the microprocessor 50 in the camcorder 22 receives the User Control Pressed accompanied by the same key code again at time t71, which is within the command waiting period Ct from time t70, at which the microprocessor 50 received the first User Control Pressed. At time t71, the microprocessor 50 recognizes that the enter key is still held down, and accordingly ignores the User Control Pressed. At this time, an increase has not occurred in the traffic in the CEC line CL, and therefore, the command waiting period Ct is maintained at the default value (e.g., 500 ms).

Thereafter, the microprocessor 50 in the camcorder 22 receives the User Control Pressed accompanied by the same key code several times (at times t72, t73, t74, and t75) within the command waiting period Ct from the previous receipt of the User Control Pressed (at times t71, t72, t73, and t74, respectively), but the microprocessor 50 similarly ignores the User Control Pressed each of these times. During this period also, an increase does not occur in the traffic in the CEC line CL, and therefore, the command waiting period Ct is maintained at the default value (e.g., 500 ms).

Then, the enter key 45 is released at time t76, previous to a time at which the User Control Pressed is to be transmitted next (i.e., 500 ms after the last transmission of the User Control Pressed). At time t76, the TV 21 stops the transmission of the User Control Pressed.

Then, because the microprocessor 50 in the camcorder 22 does not receive the User Control Pressed accompanied by the same key code within the command waiting period (500 ms) Ct from time t75, at which the microprocessor 50 received the latest User Control Pressed, the microprocessor 50 recognizes that the enter key 45 has been released, at time t77, i.e., the command waiting period Ct after time t75.

Then, at time t77, the microprocessor 50 in the camcorder 22 performs the Released process. That is, the microprocessor 50 in the camcorder 22 discards (i.e., deletes) the key code temporarily stored in the internal memory. In addition, at this time, the microprocessor 50 suspends the monitoring of the traffic in the CEC line CL.

Thereafter, the enter key 45 on the remote controller Rc is pressed again, so that the key code of the enter key 45 and the User Control Pressed are transmitted from the TV 21 to the camcorder 22, and the microprocessor 50 in the camcorder 22 receives the key code of the enter key 45 and the User Control Pressed at time t78. At time t78, the microprocessor 50 in the camcorder 22 recognizes that the enter key 45 has been pressed again, and accordingly performs a controlling operation (i.e., starting the playback of the HD video) in accordance with the instruction (which is the Playback instruction this time) associated with the pressing of the enter key at this time, stores the key code temporarily, and starts the monitoring of the traffic in the CEC line CL.

Thereafter, the microprocessor 50 in the camcorder 22 receives the User Control Pressed accompanied by the same key code again at time t79, which is within the command waiting period Ct from time t78, at which the microprocessor 50 received the first User Control Pressed. At time t79, the microprocessor 50 recognizes that the enter key is still held down, and accordingly ignores the User Control Pressed. During this period also, an increase does not occur in the traffic in the CEC line CL, and therefore, the command waiting period Ct is maintained at the default value (e.g., 500 ms).

Thereafter, the microprocessor 50 in the camcorder 22 receives the User Control Pressed accompanied by the same key code several times (at times t80, t81, t82, and t83) within the command waiting period Ct from the previous receipt of the User Control Pressed (at times t79, t80, t81, and t82, respectively), but the microprocessor 50 similarly ignores the User Control Pressed each of these times. During this period also, an increase does not occur in the traffic in the CEC line CL, and therefore, the command waiting period Ct is maintained at the default value (e.g., 500 ms).

Here, at time t84, at which the command waiting period Ct (500 ms) has not elapsed yet since time t83, at which the microprocessor 50 received the latest User Control Pressed, a CEC message that is neither the User Control Pressed nor the User Control Pressed is transmitted into the CEC line CL so as to interfere with the transmission of next User Control Pressed. Thus, the transmission of the next User Control Pressed is suspended until the transmission of this CEC message is completed.

As a result, the transmission of the next User Control Pressed is delayed for a period of time required for the transmission of this CEC message (this period of time will be hereinafter referred to also as "transmission time period" as appropriate), relative to the time at which the next User Control Pressed is originally to be transmitted (i.e., 500 ms after the last transmission of the User Control Pressed).

In practice, as shown in FIGS. 14A and 14B, the CEC message is composed of the Start Bit, the Header Block, and a minimum of 0 and a maximum of 15 Data Blocks. If the transmission of the Start Bit takes 4.5 ms and the transmission of each Block, which is 10 bits long, takes 2.4 ms×10=24 ms, the transmission of the CEC message takes approximately 28.5 ms to 388.5 ms. For this period of time, the transmission of the next User Control Pressed is delayed.

At this time, the microprocessor 50 in the camcorder 22 is monitoring the traffic in the CEC line CL, and recognizes that the traffic has been increased as a result of the breaking in of the other CEC message. Then, the microprocessor 50 measures the transmission time period of this CEC message, and adds the transmission time period to the default command waiting period Ct, thereby extending the command waiting period Ct.

As a result, even though the transmission of the User Control Pressed is delayed due to the influence of the traffic, the microprocessor 50 in the camcorder 22 is able to receive the User Control Pressed at time t85, which is within the extended command waiting period Ct from time t83. As a result, the microprocessor 50 is able to properly recognize that the enter key 45 is still held down, and accordingly ignores the User Control Pressed.

Thereafter, the microprocessor 50 in the camcorder 22 returns the command waiting period Ct to the default value, and if the microprocessor 50 does not receive the User Control Pressed within the default command waiting period Ct from the previous receipt of the User Control Pressed, the microprocessor 50 recognizes that the enter key 45 has been released, and accordingly performs the Released process.

As described above, the camcorder 22 monitors the traffic in the CEC line CL (to be precise, the CEC message that passes over the CEC line CL), and adjusts the command waiting period Ct in accordance with the current traffic as appropriate. Thus, even if a delay occurs in the transmission of the User Control Pressed from the TV 21 due to the influence of the traffic, the camcorder 22 is able to properly recognize that the key on the remote controller Rc is still held down or that the key on the remote controller Rc has been released, and accordingly operate properly in accordance with the operation on the remote controller Rc.

That is, the camcorder 22 is capable of always operating regularly regardless of the traffic in the CEC line CL.

Moreover, according to this embodiment, the command waiting period Ct is adjusted adaptively in accordance with the current traffic. Thus, when the transmission of the User Control Pressed is free from the influence of the traffic, the command waiting period Ct can be maintained at the default value (i.e., the minimum value). Therefore, for example, a response time between the release of the key and the recognition of the release of the key by the microprocessor 50 in the camcorder 22 can be shorter in the second embodiment than in the first embodiment.

(2-2) Operational Procedure at Time of Receipt of CEC Commands

Figure 23:
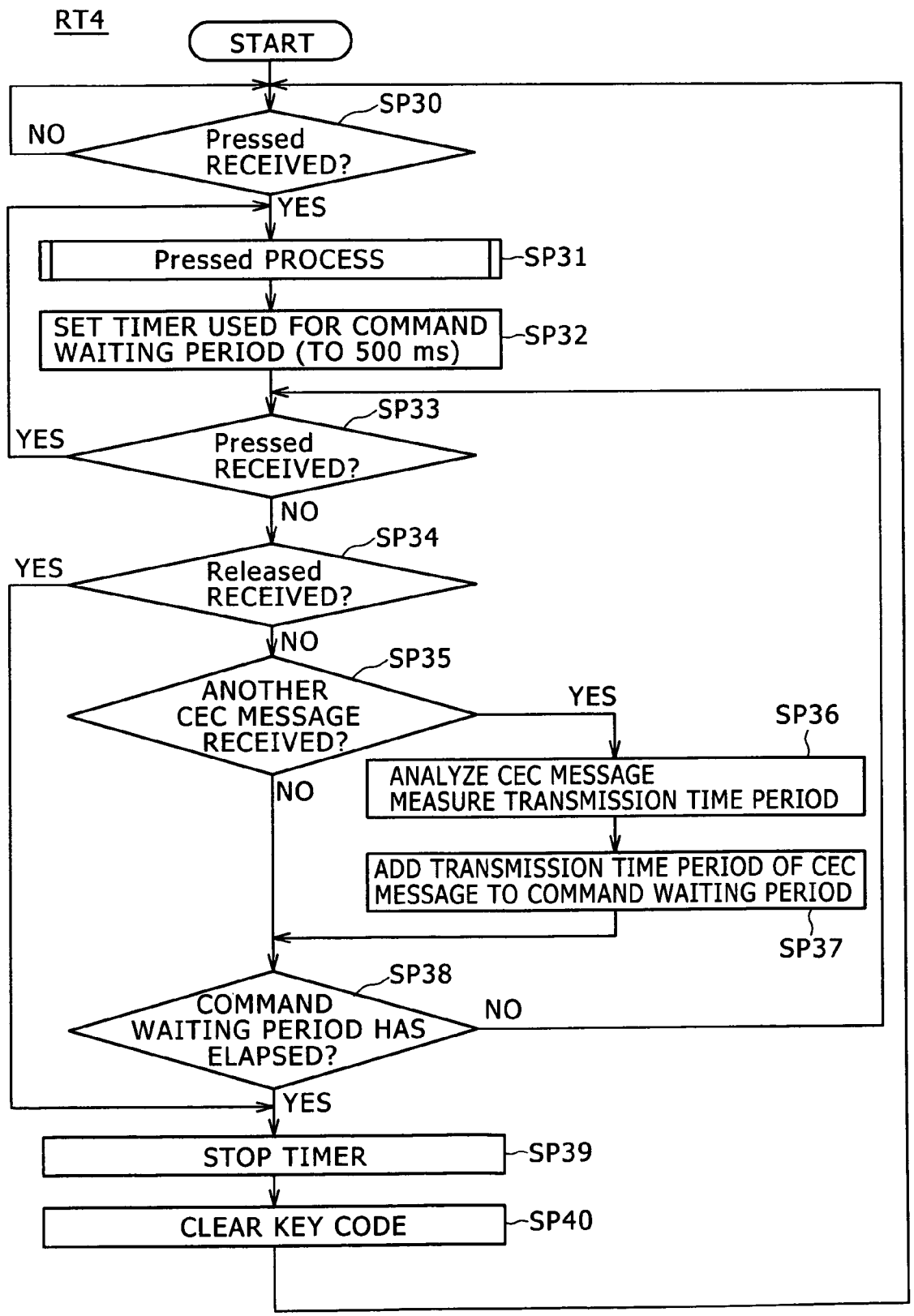
FIG. 23 is a flowchart illustrating an operational procedure according to the second embodiment.

An operational procedure when the camcorder 22 receives the CEC commands will now be described in detail below with reference to a flowchart as shown in FIG. 23. This operational procedure is also a procedure performed by the microprocessor 50 in the camcorder 22 in accordance with an operation program as read from the internal memory or the hard disk drive 51.

After establishing the HDMI connection, for example, the microprocessor 50 in the camcorder 22 starts this operational procedure RT4, and proceeds to step SP30. At step SP30, the microprocessor 50 waits for the receipt of the User Control Pressed.

If the microprocessor 50 receives the User Control Pressed, the microprocessor 50 proceeds to step SP31, and performs the process (i.e., the Pressed process) to be performed at the time of the receipt of the User Control Pressed.

The procedure (i.e., the Pressed procedure) of the Pressed process is the same as the Pressed procedure RT3 (see FIG. 21) according to the first embodiment, and therefore, a description thereof is omitted here.

After performing the Pressed process at step SP31, the microprocessor 50 proceeds to step SP32.

At step SP32, the microprocessor 50 sets the timer used for the command waiting period Ct to the default value (500 ms) and starts the timer, and starts monitoring the traffic in the CEC line CL. Then, the microprocessor 50 proceeds to step SP33.

At step SP33, the microprocessor 50 determines whether the User Control Pressed has been received within the command waiting period Ct. If it is determined at step SP33 that the User Control Pressed has been received within the command waiting period Ct, the microprocessor 50 returns to step SP31, and performs the Pressed process.

Meanwhile, if it is determined at step SP33 that the User Control Pressed has not been received within the command waiting period Ct, the microprocessor 50 proceeds to step SP34. At step SP34, the microprocessor 50 determines whether the User Control Released has been received within the command waiting period Ct. If it is determined at step SP34 that the User Control Released has not been received within the command waiting period Ct, the microprocessor 50 proceeds to step SP35.

At step SP35, the microprocessor 50 determines whether another CEC message has been received within the command waiting period Ct. If it is determined at step SP35 that another CEC message has been received within the command waiting period Ct, the microprocessor 50 proceeds to step SP36.

At step SP36, the microprocessor 50 analyzes the other CEC message received to measure the transmission time period of this CEC message. There are two possible methods for measuring the transmission time period of the CEC message at this time. One of the possible methods is to measure a time period from the Start Bit to the last Data Block of the CEC message using a different timer from the timer used for the command waiting period Ct. The other of the possible methods is to calculate the transmission time period of the CEC message based on the number of Blocks in the CEC message, with reference to a period of time (4.5 ms) required for the Start Bit and a period of time (24 ms) required for each Block, which are stored in the microprocessor 50. One of the above two possible methods is employed in step SP36.

After measuring the transmission time period of the CEC message in the above-described manner, the microprocessor 50 proceeds to step SP37. At step SP37, the microprocessor 50 adds the transmission time period of the CEC message to the default command waiting period (500 ms) Ct, thereby extending the command waiting period Ct. Then, the microprocessor 50 proceeds to step SP38.

Meanwhile, if it is determined at step SP35 that no other CEC message has been received within the command waiting period Ct, the microprocessor 50 proceeds to step SP38 without adjusting the command waiting period Ct.

At step SP38, the microprocessor 50 determines whether the command waiting period Ct has elapsed based on the elapsed time obtained from the timer. If it is determined at step SP38 that the command waiting period Ct has not elapsed yet, the microprocessor 50 returns to step SP33.

Meanwhile, if it is determined at step SP38 that the command waiting period Ct has elapsed, that means that the command waiting period Ct has elapsed since the last receipt of the User Control Pressed without the microprocessor 50 receiving the User Control Pressed or the User Control Released, and the microprocessor 50 proceeds to step SP39.

If it is determined at step SP34 that the User Control Released has been received within the command waiting period Ct, the microprocessor 50 proceeds to step SP39.

At step SP39, the microprocessor 50 stops the timer, and proceeds to step SP40. At step SP40, the microprocessor 50 determines that the key has been released, and accordingly discards (i.e., clears) the key code temporarily stored. Then, the microprocessor 50 returns to step SP30, and waits for the receipt of the User Control Pressed.

The microprocessor 50 in the camcorder 22 is configured to operate in accordance with the operational procedure RT4 as described above.

As described above, according to the second embodiment, the camcorder 22 measures the traffic in the CEC line CL, and adjusts the command waiting period Ct in accordance with the current traffic as appropriate. Thus, even if a delay occurs in the transmission of the User Control Pressed from the TV 21 due to the influence of the traffic, the camcorder 22 is able to properly recognize that the key on the remote controller Rc is still held down or that the key on the remote controller Rc has been released, and accordingly operate properly in accordance with the operation on the remote controller Rc.

That is, the camcorder 22 is capable of always operating regularly regardless of the traffic in the CEC line CL.

Moreover, according to the second embodiment, the command waiting period Ct is adjusted adaptively in accordance with the current traffic. Therefore, the microprocessor 50 is able to wait for the receipt of the CEC command, with an optimum value set in the command waiting period Ct depending on the current traffic.

(3) Other Embodiments

According to the above-described first embodiment, in order to detect the number of devices connected to the CEC line CL, the camcorder 22 issues the Polling Messages when the HDMI connection of the camcorder 22 has been established. Note, however, that this is not essential to the present invention. For example, the camcorder 22 may issue the Polling Messages regularly, in order to detect the number of devices connected to the CEC line CL.

In practice, some devices, such as the digital still camera 23, are HDMI connected to another device not constantly but only when necessary. Therefore, after the camcorder 22 detects the number of connected devices, the number of connected devices may change.

Therefore, the regular detection of the number of connected devices is effective as described above, and makes it possible to always grasp the current number of connected devices, which in turn makes it possible to adjust the command waiting period Ct appropriately in accordance with the detected number of connected devices.

Alternatively, after once detecting the number of connected devices by issuing the Polling Messages, the microprocessor may monitor the Logical Addresses described in the Initiator and Destination in the Header Block of each CEC message that passes over the CEC line CL to recognize the Logical Addresses used. In this manner also, the microprocessor is able to recognize a change in the number of HDMI-connected devices.

Further, in the above-described first embodiment, as the adjustment values for the command waiting period Ct, different values are set for the case where the number of devices connected to the CEC line CL is 2, for the case where the number of devices connected to the CEC line CL is 3 to 5, for the case where the number of devices connected to the CEC line CL is 6 to 9, and for the case where the number of devices connected to the CEC line CL is 10 or greater. Note, however, that this is not essential to the present invention. For example, a different adjustment value for the command waiting period Ct may be set for each possible number of connected devices. The only requirement in this respect is that a minimum of one adjustment value be set for the command waiting period Ct.

Still further, the adjustment values set in accordance with the estimated traffic may differ from those in the first embodiment. In practice, if the command waiting period Ct is too long, the response by the camcorder 22 to the key operation becomes late. Therefore, it is desirable that the adjustment values be set considering both the delay in the transmission of the CEC command due to the traffic and the responsiveness of the camcorder 22 to the key operation. Thus, the adjustment values may be actually set considering both the factors. Still further, it may be so arranged that the adjustment values are stored in the TV 21, which is a main device of the inter-device control system 20, and that the camcorder 22 acquires the adjustment values from the TV 21. Still further, it may be so arranged that the adjustment of the command waiting period Ct using one of the adjustment values is performed at the end of the number-of-connected-devices detecting procedure RT1, and that the timer is caused to operate using the adjusted command waiting period Ct thereafter.

Figure 24:
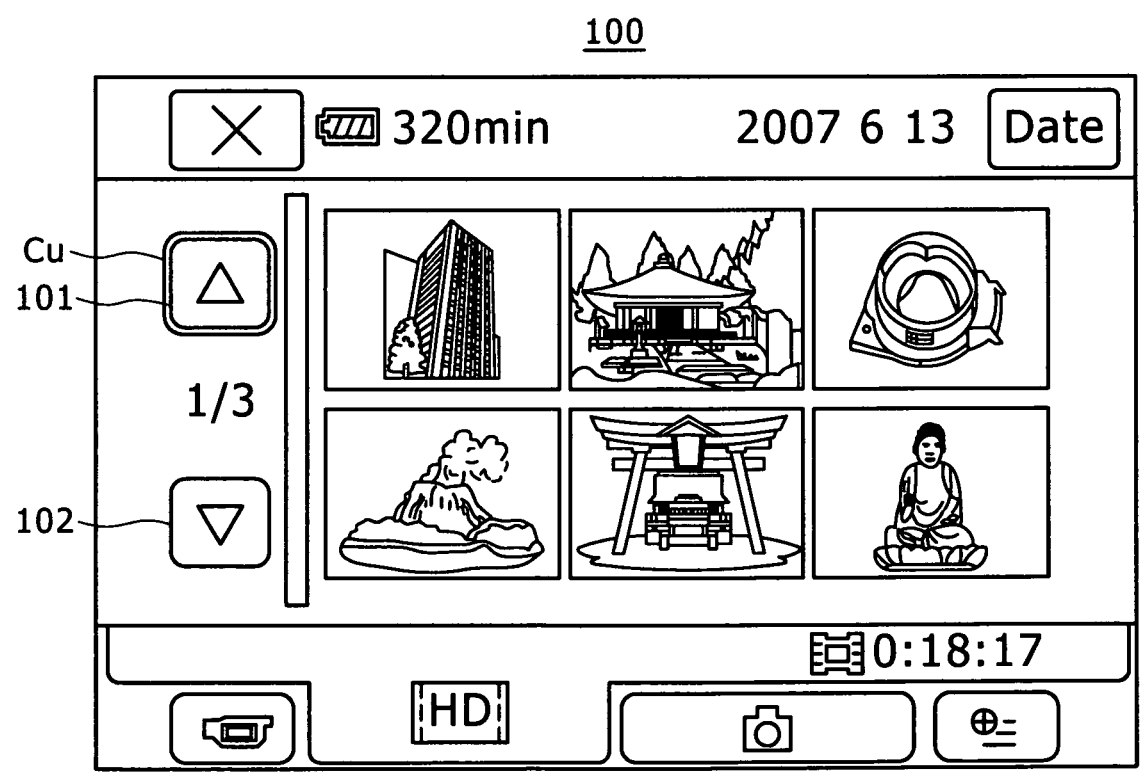
FIG. 24 shows a thumbnail screen according to another embodiment.

Still further, according to the above-described first embodiment, the one-shot operation is performed in the case where the instruction associated with the pressing of the key is the play/pause instruction, and the repetitive operation is performed in the case where the instruction associated with the pressing of the key is the rewinding instruction, the fast-forwarding instruction, or the HD video switching instruction. Referring to FIG. 24, for example, it is also desirable that the repetitive operation be performed in the case where the enter key 45 on the remote controller Rc has been pressed in a situation where an up button 101 or a down button 102 is selected. Here, the up button 101 and the down button 102 are displayed on a thumbnail screen 100 for displaying a list of thumbnails of HD videos, and the thumbnail screen 100 is displayed on the TV 21. The up button 101 is assigned an instruction to scroll the list of thumbnails upward, whereas the down button 102 is assigned an instruction to scroll the list of thumbnails downward.

Still further, in the above-described first and second embodiments, the present invention is applied to the camcorder 22 compliant with the CEC in the HDMI. Note, however, that this is not essential to the present invention. The present invention is applicable to a variety of electronic devices that are connected to one or more devices via a specified signal line and capable of operating in accordance with a control signal transmitted from any of the one or more connected devices and which set a signal waiting period that serves a purpose similar to that of the command waiting period Ct. Examples of such electronic devices include a digital camera, an AV amplifier, a video recorder, a personal computer, and an audio component.

Still further, note that the electronic device according to the present invention may not necessarily be an electronic device that accepts an operational command from a remote controller for another device. The present invention is also applicable to an electronic device that accepts an operational command from another input device, for example.

Still further, according to the above-described second embodiment, in the case where another CEC message has been received within the command waiting period Ct, the command waiting period Ct is extended by adding the transmission time period of that CEC message to the command waiting period Ct after the command waiting period Ct has elapsed. Note, however, that this is not essential to the present invention. For example, it may be so arranged that, when another CEC message has been received within the command waiting period Ct, the timer used for the command waiting period Ct is stopped temporarily, and that the timer is caused to start operating again upon completion of the transmission of the other CEC message. In this case also, the command waiting period Ct is extended in essence.

Still further, according to the above-described first and second embodiments, the microprocessor 50 in the camcorder 22 performs the above-described number-of-connected-devices detecting procedure and operational procedures in accordance with the program read from the internal memory or the hard disk drive 51. Note, however, that this is not essential to the present invention. For example, the programs for performing these procedures may be acquired from another device connected to the camcorder 22 and installed into the hard disk drive 51. Also, these programs may be stored in a storage medium such as an optical disc or a memory card, and a drive that is capable of reproducing data from this storage medium may be connected to the camcorder 22. Then, the programs may be read from the storage medium via the drive and installed into the hard disk drive 51. Here, if the camcorder 22 is not originally equipped with an interface for connecting the camcorder 22 to such another device or drive, the camcorder 22 may be provided with such an interface afterward.

Still further, according to the above-described first and second embodiments, primary components of the camcorder 22 as an electronic device are: the HDMI interface 62, which serves as a reception section for receiving the CEC message as the control signal or an operation signal; and the microprocessor 50, which serves as a control section for performing the Pressed process as a specified process, and which also serves as a waiting period adjustment section for adjusting the command waiting period Ct as a signal waiting period. Note, however, that this is not essential to the present invention. An electronic device according to another embodiment of the present invention may have a different reception section, a different control section, and a different waiting period adjustment section, as long as they have functions similar to those of the HDMI interface 62 and the microprocessor 50.

Still further, the present invention is not limited to the above-described first and second embodiments and the other embodiments as described above. The scope of the present invention encompasses any combination of the first and second embodiments and the other embodiments as described above, and a part of any of the above-described embodiments.

For example, the first embodiment may be combined with the second embodiment. That is, it may be so arranged that the command waiting period Ct is first adjusted in the manner of the first embodiment, and that additionally, the adjusted command waiting period Ct is extended in the manner of the second embodiment if another CEC message is received within the adjusted command waiting period Ct.

The present invention is applicable to a wide variety of electronic devices, such as camcorders or video recorders, that are capable of being connected (e.g., HDMI connected) to another device and thus being controlled from the other device.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device that is connected to one or more other devices via a specified signal line and capable of operating in accordance with a control signal transmitted from any of the one or more other devices connected to the electronic device, the electronic device comprising:
    a reception section configured to receive the control signal transmitted from any of the one or more other devices connected to the electronic device;
    a control section configured to perform a specified process if, after receiving a specific control signal, said reception section does not receive a control signal corresponding to the specific control signal within a set signal waiting period; and
    a waiting period adjustment section configured to adjust the signal waiting period based on traffic in the signal line,
    wherein, if said reception section, after receiving a pressing operation signal representing pressing of a specific key on a controller, does not receive the pressing operation signal or a release operation signal representing release of the specific key within the set signal waiting period, said control section performs a process of recognizing the release of the specific key.

2. The electronic device according to claim 1, wherein said waiting period adjustment section estimates the traffic in the signal line based on the number of devices connected to one another via the signal line, and adjusts the signal waiting period based on the estimated traffic.

3. The electronic device according to claim 2, wherein said waiting period adjustment section adjusts the signal waiting period in accordance with the number of devices connected to one another via the signal line, based on adjustment values for the signal waiting period, the adjustment values having been previously set based on estimated traffic for each possible number of devices connected to one another via the signal line, the estimated traffic being as a verification result of the traffic for each possible number of devices.

4. The electronic device according to claim 1, wherein said waiting period adjustment section monitors the control signal received by said reception section to measure the traffic in the signal line, and adjusts the signal waiting period based on the measured traffic.

5. An electronic device that is connected to one or more other devices via a specified signal line and capable of operating in accordance with a control signal transmitted from any of the one or more other devices connected to the electronic device, the electronic device comprising:
    a reception section configured to receive the control signal transmitted from any of the one or more other devices connected to the electronic device;
    a control section configured to perform a specified process if, after receiving a specific control signal, said reception section does not receive a control signal corresponding to the specific control signal within a set signal waiting period; and
    a waiting period adjustment section configured to adjust the signal waiting period based on traffic in the signal line,
    wherein the control signal transmitted from any of the one or more other devices connected to the electronic device is an operation signal representing an operation performed via an input device for the other device, and
    wherein,
        the operation signal is an operation signal representing an operation performed via a remote controller for the other device connected to the electronic device, and
        if said reception section, after receiving a pressing operation signal representing pressing of a specific key on the remote controller, does not receive the pressing operation signal or a release operation signal representing release of the specific key within the set signal waiting period, said control section performs a process of recognizing the release of the specific key.

6. The electronic device according to claim 1, wherein, the specified signal line is a Consumer Electronics Control (CEC) line compliant with the High-Definition Multimedia Interface (HDMI) standard, and
    the control signal is a CEC message defined in the HDMI standard.

7. An electronic device that is connected to one or more other devices via a specified signal line and capable of operating in accordance with a control signal transmitted from any of the one or more other devices connected to the electronic device, the electronic device comprising:
    reception means for receiving the control signal transmitted from any of the one or more other devices connected to the electronic device;
    control means for performing a specified process if, after receiving a specific control signal, said reception means does not receive a control signal corresponding to the specific control signal within a set signal waiting period; and
    waiting period adjustment means for adjusting the signal waiting period based on traffic in the signal line,
    wherein, if said reception means, after receiving a pressing operation signal representing pressing of a specific key on a controller, does not receive the pressing operation signal or a release operation signal representing release of the specific key within the set signal waiting period, said control means performs a process of recognizing the release of the specific key.

* * * * *